United States Patent [19]
Sohara

[11] Patent Number: 6,078,446
[45] Date of Patent: *Jun. 20, 2000

[54] SEMICONDUCTOR INTEGRATED CIRCUIT DEVICE FOR READING AND WRITING

[75] Inventor: Yasuyuki Sohara, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/964,902

[22] Filed: Nov. 5, 1997

[30] Foreign Application Priority Data

Jun. 6, 1997 [JP] Japan .................................. 9-149254

[51] Int. Cl.⁷ .............................. G11B 5/09; G11B 5/02
[52] U.S. Cl. ............................................ 360/46; 360/68
[58] Field of Search .................................. 360/46, 63, 68

[56] References Cited

U.S. PATENT DOCUMENTS 5,333,081 7/1994 Mitsui ........................................ 360/46

FOREIGN PATENT DOCUMENTS 59-139113 8/1984 Japan .

*Primary Examiner*—W. Chris Kim
*Attorney, Agent, or Firm*—Burns, Doane, Swecker & Mathis, LLP

[57] ABSTRACT

A semiconductor integrated circuit device including pairs of lower level input/output terminals 6 and 7 and pairs of high capacity input/output terminals 8 and 9, high capacity read amplifiers 10 and 11 and high capacity write drivers 14 and 15 both of which are connected to the pairs of high capacity input/output terminals 6 and 7, lower level read amplifiers 12 and 13 and the lower level write drivers 16 and 17 both of which are connected to the pairs of lower level input/output terminals 8 and 9, in which outputs from the high capacity read amplifiers 10 and 11 and outputs from the lower level read amplifiers 12 and 13 are outputted to data output terminals 36 and 37 via an amplifying circuit 35 and an output from a data input terminal 40 is outputted selectively to either one of the high capacity write drivers 14 and 15 and the lower level write drivers 16 and 17 by a write data forming circuit 39.

16 Claims, 13 Drawing Sheets

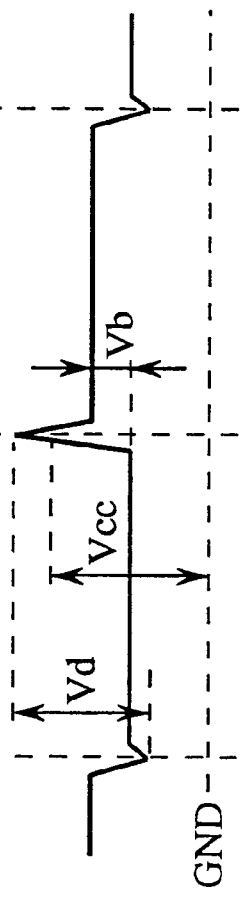
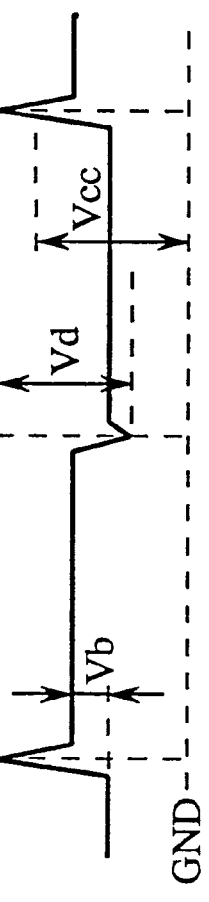
FIG.8A  int. WD
FIG.8B  int. /WD
FIG.8C  WRITE CURRENT WAVEFORM
FIG.8D  H0X, H1X TERMINAL VOLTAGE
FIG.8E  H0Y, H1Y TERMINAL VOLTAGE

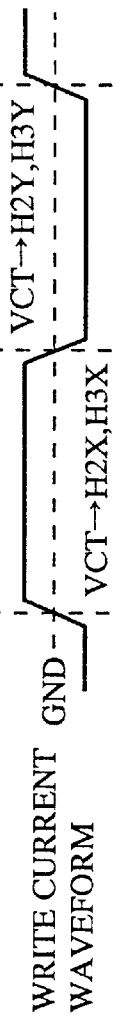
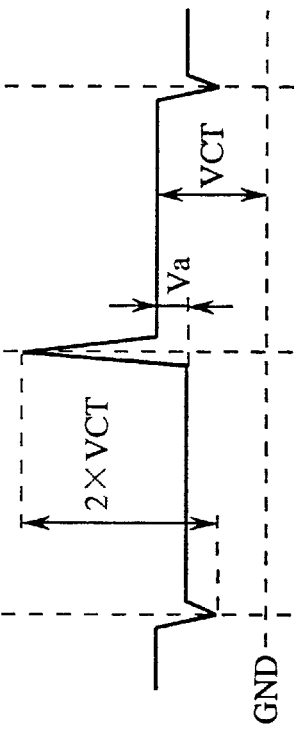
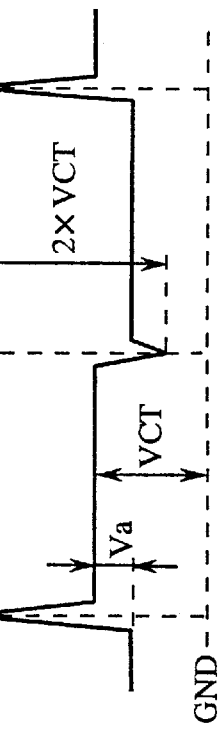
FIG.16A PRIOR ART   int. WD
FIG.16B PRIOR ART   int. /WD
FIG.16C PRIOR ART   WRITE CURRENT WAVEFORM
FIG.16D PRIOR ART   H2X, H3X TERMINAL VOLTAGE
FIG.16E PRIOR ART   H2Y, H3Y TERMINAL VOLTAGE

SEMICONDUCTOR INTEGRATED CIRCUIT DEVICE FOR READING AND WRITING

BACKGROUND OF THE INVENTION

1. Field of the Invention

The present invention relates to a semiconductor integrated circuit device for reading and writing and for amplifying and outputting data recorded on a record medium comprising a floppy disk which is read by a magnetic head and for recording data on the record medium by flowing current based on written data to a write/read coil of the magnetic head.

The present invention particularly relates to a semiconductor integrated circuit device for reading and writing used in a floppy disk drive device capable of reading and writing to and from both of a floppy disk (lower level record medium) having a storage capacity of, for example, 1 M, 1.44 M, 1.6 M or 2 M and a floppy disk (high capacity record medium) having a storage capacity of, for example, 100 M or more as record media.

2. Description of the Prior Art

A floppy disk drive device capable of reading and writing to and from a floppy disk (hereinafter, referred to as lower level record medium) having a storage capacity of 1 M, 1.6 M or 2 M, is generally known.

In recent years, a floppy disk (hereinafter, referred to as high capacity record medium) having a considerably enhanced storage capacity, for example, a storage capacity of 100 M or 200 M, has been proposed.

A high capacity record medium having an outer shape quite the same as that of a lower level record medium, that is, 3.5 inch size, has been proposed.

Accordingly, an investigation has been started on whether a high capacity record medium may be read or written by a floppy disk drive device the same as that for a lower level record medium.

In view of such a situation, the inventors have investigated on a semiconductor integrated circuit device for reading and writing which amplifies and outputs data recorded on a record medium comprising a floppy disk which is read by a magnetic head and recording data on the record medium by flowing current based on written data to a write/read coil of the magnetic head, particularly on whether a single semiconductor integrated circuit device for both of a high capacity record medium and a lower level record medium can be constructed.

That is, as shown in FIG. 13, a single semiconductor integrated circuit device 100 is installed with read amplifiers 110 through 113 and write drivers 114 through 117 of both media.

In FIG. 13, numerals 101 and 102 designate write/read coils of a write/read head in a high capacity magnetic head for reading and writing to and from a high capacity record medium (hereinafter, referred to as high capacity write/read coil). The high capacity write/read coil 101 is for the surface of the high capacity record medium and the high capacity write/read coil 102 is for the rear face of the high capacity record medium.

Numerals 103 and 104 designate write/read coils of a write/read head in a lower level magnetic head for writing and reading to and from a lower level record medium (hereinafter, referred to as lower level write/read coil). The lower level write/read coil 103 is for the surface of a lower level record medium and the lower level write/read coil 104 is for the rear face of the lower level record medium.

Numeral 105 designates a center tap terminal installed on the semiconductor integrated circuit device 100 for outputting a center tap voltage VCT and the center tap terminal 105 is connected to center taps CT of the high capacity write/read coils 101 and 102 and the lower level write/read coils 103 and 104.

Notations 106X and 106Y designate high capacity input/output terminals H0X and H0Y installed on the semiconductor integrated circuit device 100 to which the high capacity write/read coil 101 is connected. Notations 107X and 107Y designate high capacity input/output terminals H1X and H1Y installed on the semiconductor integrated circuit device 100 to which the high capacity write/read coil 102 is connected. Notations 108X and 108Y designate lower level input/output terminals H2X and H2Y installed on the semiconductor integrated circuit device 100 to which the lower level write/read coil 103 is connected. Notations 109X and 109Y designate lower level input/output terminals H3X and H3Y installed on the semiconductor integrated circuit device 100 to which the lower level write/read coil 104 is connected.

Numeral 110 designates a high capacity read amplifier input nodes of which are connected to the high capacity input/output terminals 106X and 106Y, numeral 111 designates a high capacity read amplifier input nodes of which are connected to the high capacity input/output terminals 107X and 107Y, numeral 112 designates a lower level read amplifier input nodes of which are connected to the lower level input/out terminals 108X and 108Y, numeral 113 designates a lower level read amplifier input nodes of which are connected to the lower level input/output terminals 109X and 109Y, numeral 114 designates a high capacity write driver output nodes of which are connected to the high capacity input/output terminals 106X and 106Y, numeral 115 designates a high capacity write driver output nodes of which are connected to the high capacity input/output terminals 107X and 107Y, numeral 116 designates a lower level write driver output nodes of which are connected to the lower level input/output terminals 108X and 108Y, and numeral 117 designates a lower level write driver output nodes of which are connected to the lower level input/output terminals 109X and 109Y.

Further, the high capacity read amplifiers 110 and 111 as well as the lower level read amplifiers 112 and 113 are integrated to the same semiconductor integrated circuit device and therefore, as shown in FIG. 14, the high capacity read amplifiers 110 and 111 and the lower level read amplifiers 112 and 113 are provided with the same circuit structure such that they can be constructed by the same fabrication process.

In FIG. 14, numeral 118 designates potential nodes for internal power source to which internal voltage Vc is applied, numeral 119 designates an input node to which a corresponding one of the input/output terminals 106X through 109X is connected, numeral 120 designates an input node to which a corresponding one of the input/output terminals 106Y through 109Y is connected and numerals 121 and 122 designate output nodes.

Numeral 123 designates an NPN type bipolar transistor the base electrode of which is connected to the input node 119, the collector electrode of which is connected to the output node 121 and the emitter electrode of which is connected to a common connection point 124, and numeral 125 designates an NPN type bipolar transistor the base electrode of which is connected to the input node 120, the collector electrode of which is connected to the output node 122 and the emitter electrode of which is connected to the common connection point 124 and which constitutes a differential pair of transistors along with the transistor 123. Numeral 126 designates a load element comprising a resistor element connected between the potential node 118 for internal power source and the output node 121 and numeral 127 designates a load element comprising a resistor element connected between the potential node 118 for internal power source and the output node 122.

Numeral 128 designates a constant current source connected between the common connection point 124 and the ground potential node. When a read/write signal R/W is received and the read/write signal R/W signifies writing, the constant current source 128 brings the common connection point 128 into an electrically floating state by which the read amplifier is brought into a deactivated state. Further, when the read/write signal R/W signifies reading, the constant current source 128 performs an operation of drawing constant current from the common connection point 124 to the ground potential node by which the read amplifier is brought into an activated state.

Meanwhile, the high capacity write drivers 114 and 115 as well as the lower level write drivers 116 and 117 are integrated to the same semiconductor integrated circuit device and therefore, as shown in FIG. 15, the high capacity write drivers 114 and 115 and the lower level write drivers 116 and 117 are constructed by the same circuit structure such that they can be constructed by the same fabrication process.

In FIG. 15, numeral 129 designates an output node to which a corresponding one of the input/output terminals 106X through 109X is connected, numeral 130 designates an output node to which a corresponding one of the input/output terminals 106Y through 109Y is connected, numeral 131 designates an input node to which an internal write signal int.WD is inputted and numeral 132 designates an input node to which an internal write signal int./WD that is an inverted signal of the internal write signal int.WD is inputted.

Numeral 133 designates an NPN type bipolar transistor the base electrode of which is connected to the input node 131, the collector electrode of which is connected to the output node 129 and the emitter electrode of which is connected to a common connection point 134 and numeral 135 designates an NPN type bipolar transistor the base electrode of which is connected to the input node 132, the collector electrode of which is connected to the output node 130 and the emitter electrode of which is connected to the common connection point 134 and which constitutes a differential pair of transistors along with the transistor 133.

Numeral 136 designates a constant current source connected between the common connection point 134 and the ground potential node. When the read/write signal R/W is received and the read/write signal R/W signifies reading, the constant current source 136 brings the common connection point 134 into an electrically floating state by which the write driver is brought into a deactivated state. Further, when the read/write signal R/W signifies writing, the constant current source 136 performs an operation of drawing constant current from the common connection point 134 to the ground potential node by which the write driver is brought into an activated state.

Further, a constant current value of the constant current sources in the write drivers 114 and 115 connected to the high capacity input/output terminals 106X and 106Y, and 107X and 107Y, is 5 through 6 times as much as a constant current value of the constant current sources in the write drivers 116 and 117 connected to the lower level input/output terminals 108X and 108Y, and 109X and 109Y.

SUMMARY OF THE INVENTION

When the semiconductor integrated circuit device constructed as described above is fabricated and the writing and reading operations are performed, the following problems are occur.

When, information stored in a high capacity record medium is read by using the high capacity magnetic head, S/N ratio is poor and signal is replete with noise.

This seems to be caused by the following reason. Incidentally, the high capacity magnetic head having the high capacity write/read coil 101 is for the top surface of a high capacity record medium and the high capacity magnetic head having the high capacity write/read coil 102 is for the rear face of the high capacity record medium and the both heads perform substantially the same operation and therefore, an explanation will be given of the case where the reading operation is performed by the high capacity magnetic head having the high capacity write/read coil 101 as follows for convenience of explanation.

Even when information stored by a line density 50 times as much as that of a lower level record medium or higher, is read by the high capacity magnetic head, the potential difference between the high capacity input/output terminals 106X and 106Y, that is, the read voltage is small and accordingly, signal is liable to receive influence of noise. However, the transistors 123 and 125 constituting the differential pair in the high capacity read amplifier 110 or 111 are fabricated by the same process as that of the lower read amplifiers 112 and 113 and therefore, the PN junction withstand voltage between the base and the emitter is large and the area of the emitter becomes necessarily large and the like by which the transistor is not suitable for low noise. Accordingly, a signal outputted from the output nodes 121 and 122 of the high capacity read amplifier 110 or 111 is provided with poor S/N ratio and replete with noise.

Conversely, it is conceivable that as the transistor 123 or 125 constituting the differential pair of the high capacity read amplifier 110 or 111, a transistor having low noise may be constituted by reducing the area of the emitter by forming the emitter in a comb-like shape. However, in this case, the transistors of the lower level read amplifiers 112 and 113 may be destroyed when information is written in a lower level record medium.

This seems to be caused by the following. Incidentally, a lower level magnetic head having a lower level write/read coil 103 is for the top surface of a lower level record medium and a lower level magnetic head having the lower level write/read coil 104 is for the rear face of the lower level record medium and the both heads perform substantially the same operation and accordingly, an explanation will be given of the case where writing operation is performed by the lower level magnetic head having the lower level write/read coil 103 as follows for convenience of explanation.

Assuming now that the internal write signal int.WD inputted to the input node 131 is at "H" level as shown in FIG. 16A and the internal write signal int./WD inputted to the input node 132 is at "L" level as shown in FIG. 16B, the transistor 133 constituting the differential pair in the lower level write driver 116 is brought into a conductive state and the transistor 135 is brought into a nonconductive state.

Accordingly, current flows from the center tap CT of the lower level write/read coil 103 to the ground potential node via the input/output terminal 108X, the input node 129, the transistor 133, the common connection point 134 and the constant current source 136. At this moment, the voltage generated at the input/output terminal 108X is provided with a value of the center tap voltage VCT given to the center tap CT of the lower level write/read coil 103 subtracted by a voltage effect Va by the lower level write/read coil 103 as shown in FIG. 16D. Further, a voltage generated at the input/output terminal 108Y becomes the center tap voltage VCT given to the center tap CT of the lower level write/read coil 103 as shown in FIG. 16E.

Next, when the internal write signal int.WD is changed from "H" level to "L" level as shown in FIG. 16A and the internal write signal int./WD inputted to the input node 132 is changed from "L" level to "H" level as shown in FIG. 16B, the transistor 133 constituting the differential pair in the lower level write driver 116 is changed to a nonconductive state and the transistor 135 is changed to a conductive state.

Accordingly, current flows from the center tap CT of the lower level write/read coil 103 to the ground potential node via the input/output terminal 108Y, the input node 130, the transistor 135, the common connection point 134 and the constant current source 136. A reverse electromotive voltage is caused at the lower level write/read coil 103 by the change of current at that time and a voltage generated at the input/output terminal 108X is instantaneously elevated as shown in FIG. 16D and thereafter, the voltage becomes the center tap voltage VCT given to the center tap CT of the lower level write/read coil 103. Further, a voltage generated at the input/output terminal 108Y is instantaneously dropped as shown in FIG. 16E and thereafter, the voltage is provided with a value of the center tap voltage VCT given to the center tap CT of the lower level write/read coil 103 subtracted by a voltage drop Va by the lower level write/read coil 103. The instantaneous voltage difference generated between the input/output terminals 108X and 108Y in changing the levels of the internal write signal int.WD and the internal write signal int./WD, is provided with a value substantially twice as much as the center tap voltage VCT since current flowing in the lower level write/read coil 103 is large (for example, about 60 mA).

The voltages generated at the input/output terminals 108X and 108Y are also applied to the input nodes of the lower level read amplifier 112. The lower level read amplifier 112 is brought into a deactivated state by the read/write signal R/W and therefore, the common connection point 124 is brought into an electrically floating state. Accordingly, when the levels of the internal write signal int.WD and the internal write signal int./WD are changed, a voltage of a positive voltage applied on the input node 119 subtracted by a voltage between the base and the emitter of the transistor 113 is generated and a voltage of a difference between a potential generated at the common connection point 124 and a potential generated at the input node 120, is applied between the base and the emitter of the transistor 125 as an inverse voltage. As a result, the transistor 125 needs to have a withstand voltage capable of withstanding the voltage of the difference between the potential generated at the common connection point 124 and the potential generated at the input node 120, that is, a high voltage (substantially twice of center tap voltage VCT—voltage between emitter and base of transistor 123). However, the withstand voltage is low in order to lower the noise level of the high capacity read amplifier 110 or 111 and therefore, the transistor 125 may be destroyed in achieving the high capacity of the high capacity read amplifier 110 or 111.

Incidentally, also in the case where the internal write signal int.WD is changed from "L" level to "H" level and the internal write signal int./WD is changed from "H" level to "L" level, in a similar manner, a voltage twice as much as the center tap voltage VCT is instantaneously generated across the input/output terminals 108X and 108Y by which a high inverse voltage (substantially twice of center tap voltage VCT—voltage between base and emitter of transistor 125) is applied between the base and the emitter of the transistor 123.

In conclusion, in the case where a single semiconductor integrated circuit device for reading and writing is intended to constitute in respect of both of a high capacity record medium and a lower level record medium, when transistors having high withstand voltage are used for the transistors 123 and 125 constituting the differential pair of the lower level amplifiers 112 and 113, the low noise level of the high capacity read amplifiers 110 and 111 cannot be achieved and when transistors achieving the low noise of the transistors 123 and 125 constituting the differential pairs of the high capacity read amplifiers 110 and 111, the withstand voltage of the lower level read amplifiers 110 and 111 is deteriorated, which are conflicting problems.

The present invention has been carried out in view of the above problems and it is an object of the present invention to provide a semiconductor integrated circuit device for reading and writing that is integrated with read amplifiers and write drivers for a high capacity record medium and read amplifiers and write drivers for a lower level record medium.

It is a second object of the present invention to provide a semiconductor integrated circuit device for reading and writing whereby low noise level of a high capacity read amplifier is achieved and a lower level read amplifier is not destroyed even by a voltage difference generated in changing internal write signals between input/output terminals to which input nodes of the lower level read amplifier are connected.

It is a third object of the present invention to provide a semiconductor integrated circuit device for reading and writing whereby terminals for a gain switch signal in respect of an amplifying circuit for amplifying an output from either one read amplifier selected from a high capacity read amplifier and a lower level read amplifier, are dispensed with and the gain switch signal can be generated at an internal portion of the semiconductor integrated circuit device.

It is a fourth object of the present invention to provide a semiconductor integrated circuit device for reading and writing capable of subjecting an output from a lower level read amplifier to digital conversion and outputting the converted value as a read signal.

According to a first aspect of the present invention, there is provided a semiconductor integrated circuit device for reading and writing including pairs of lower level input/output terminals to which write/read coils of write/read heads in lower level magnetic heads are connected, pairs of high capacity input/output terminals to which write/read coils of write/read heads in high capacity magnetic heads are connected, lower level read amplifiers pairs of input nodes of which are connected to the pairs of lower level input/output terminals, high capacity read amplifiers pairs of input nodes of which are connected to the pairs of high capacity input/output terminals, lower level write drivers pairs of output nodes of which are connected to the pairs of lower level input/output terminals, high capacity write drivers pairs of output nodes of which are connected to the pairs of high capacity input/output terminals, wherein each of the lower level write drivers includes a pair of input nodes to which write signals are inputted, a first transistor a base electrode of which is connected to one of the pair of input nodes of the each of the lower level write drivers and a collector electrode of which is connected to one of the pair of output nodes of the each of the lower level write drivers, and a second transistor a base electrode of which is connected to other of the pair of input nodes of the each of the lower level write drivers, an emitter electrode of which is connected to an emitter electrode of the first transistor and a collector electrode of which is connected to other of the pair of output nodes of the each of the lower level write drivers, and wherein each of the high capacity write drivers includes a pair of input nodes to which write signals are inputted, a third transistor a base electrode of which is connected to one of the pair of input nodes of the each of the high capacity write drivers and a collector electrode of which is connected to one of the pair of output nodes of the each of the high capacity write drivers, a fourth transistor a base electrode of which is connected to other of the pair of input nodes of the each of the high capacity write drivers, an emitter electrode of which is connected to an emitter electrode of the third transistor and a collector electrode of which is connected to other of the pair of output nodes of the each of the high capacity write drivers, a fifth transistor a base electrode of which is connected to the other of the pair of input nodes of the each of the high capacity write drivers, an emitter electrode of which is connected to the one of the pair of output nodes of the each of the high capacity write drivers and a collector electrode of which is connected to a power source potential node, and a sixth transistor a base electrode of which is connected to the one of the pair of input nodes of the each of the high capacity write drivers, an emitter electrode of which is connected to the other of the pair of output nodes of the each of the high capacity write drivers and a collector electrode of which is connected to the power source potential node.

According to a second aspect of the present invention, there is provided a semiconductor integrated circuit device for reading and writing including a first pair of lower level input/output terminals to which a write/read coil of a write/read head in a first lower level magnetic head is connected, a second pair of lower level input/output terminals to which a write/read coil of a write/read head in a second lower level magnetic head is connected, a first pair of high capacity input/output terminals to which a write/read coil of a write/read head in a first high capacity magnetic head is connected, a second pair of high capacity input/output terminals to which a write/read coil of a write/read head in a second high capacity magnetic head is connected, a first lower level read amplifier a pair of input nodes of which are connected to the first pair of lower level input/output terminals, a second lower level read amplifier a pair of input nodes of which are connected to the second pair of lower level input/output terminals, a first high capacity read amplifier a pair of input nodes of which are connected to the first pair of high capacity input/output terminals, a second high capacity read amplifier a pair of input nodes of which are connected to the second pair of high capacity input/output terminals, a first lower level write driver a pair of output nodes of which are connected to the first pair of lower level input/output terminals, a second lower level write driver a pair of output nodes of which are connected to the second pair of lower level input/output terminals, a first high capacity write driver a pair of output nodes of which are connected to the first pair of high capacity input/output terminals, a second high capacity write driver a pair of output nodes of which are connected to the second pair of high capacity input/output terminals, a selector for receiving a head select signal, selecting either one of the first and the second lower level read amplifiers and the first and the second high capacity read amplifiers and outputting a gain switch signal designating which one of the lower level read amplifier and the high capacity read amplifier is selected, and an amplifying circuit for receiving an output from the read amplifier selected by the selector, receiving the gain switch signal from the selector, amplifying the output from one of the lower level read amplifiers which the gain switch signal selects by a first gain and outputting the amplified output as read signals to data output terminals, amplifying the output from one of the high capacity read amplifiers which the gain switch signal selects by a second gain larger than the first gain and outputting the amplified output to the data output terminals as read signals.

According to a third aspect of the present invention, there is provided a semiconductor integrated circuit device for reading and writing including a first pair of lower level input/output terminals to which a write/read coil of a write/read head in a first lower level magnetic head is connected, a second pair of lower level input/output terminals to which a write/read coil of a write/read head in a second lower level magnetic head is connected, a first pair of high capacity input/output terminals to which a write/read coil of a write/read head in a first high capacity magnetic head is connected, a second pair of high capacity input/output terminals to which a write/read coil of a write/read head in a second high capacity magnetic head is connected, a first lower level read amplifier a pair of input nodes of which are connected to the first pair of lower level input/output terminals, a second lower level read amplifier a pair of input nodes of which are connected to the second pair of lower level input/output terminals, a first high capacity read amplifier a pair of input nodes of which are connected to the first pair of high capacity input/output terminals, a second high capacity read amplifier a pair of input nodes of which are connected to the second pair of high capacity input/output terminals, a first lower level write driver a pair of output nodes of which are connected to the first pair of lower level input/output terminals, a second lower level write driver a pair of output nodes of which are connected to the second pair of lower level input/output terminals, a first high capacity write driver a pair of output nodes of which are connected to the first pair of high capacity input/output terminals, a second high capacity write driver a pair of output nodes of which are connected to the second pair of high capacity input/output terminals, a selector for receiving a head select signal and selecting either one of the first and the second lower level read amplifiers and the first and the second high capacity read amplifiers, a digital signal converting circuit for receiving an output from one of the lower level read amplifiers selected by the selector, converting the output into a digital signal having a binary value based on the received output and outputting the converted output as read signals to a first one of data output terminals, and an amplifying circuit for receiving an output from one of the high capacity read amplifiers selected by the selector, amplifying the received output by a predetermined gain and outputting the amplified output as read signals to a second one of the data output terminals.

According to a fourth aspect of the present invention, there is provided a semiconductor integrated circuit device for reading and writing including a first pair of lower level input/output terminals to which a write/read coil of a write/read head in a first lower level magnetic head is connected, a second pair of lower level input/output terminals to which a write/read coil of a write/read head in a second lower level magnetic head is connected, a first pair of high capacity input/output terminals to which a write/read coil of a write/read head in a first high capacity magnetic head is connected, a second pair of high capacity input/output terminals to which a write/read coil of a write/read head in a second high capacity magnetic head is connected, a first lower level read amplifier a pair of input nodes of which are connected to the first pair of lower level input/output terminals, a second lower level read amplifier a pair of input nodes of which are connected to the second pair of lower level input/output terminals, a first high capacity read amplifier a pair of input nodes of which are connected to the first pair of high capacity input/output terminals, a second high capacity read amplifier a pair of input nodes of which are connected to the second pair of high capacity input/output terminals, a first lower level write driver a pair of output nodes of which are connected to the first pair of lower level input/output terminals, a second lower level write driver a pair of output nodes of which are connected to the second pair of lower level input/output terminals, a first high capacity write driver a pair of output nodes of which are connected to the first pair of high capacity input/output terminals, a second high capacity write driver a pair of output nodes of which are connected to the second pair of high capacity input/output terminals, a head selecting circuit for receiving a head select signal and outputting a head selection decode signal for designating either one of the first and the second lower level magnetic heads and the first and the second high capacity magnetic heads, a read amplifier selecting circuit for activating either one of the first and the second high capacity read amplifiers and the first and the second lower level read amplifiers based on the head selection decode signal from the head selecting circuit, an amplifying circuit for amplifying an output from one of the first and the second high capacity read amplifiers and the first and the second lower level read amplifiers selected by the read amplifier selecting circuit by a predetermined gain and outputting the amplified output to data output terminals, and a write data forming circuit for selectively outputting internal write signals based on write signals inputted via data input terminals to either one of the first and the second high capacity write drivers and the first and the second lower level write drivers based on the head selection decode signal from the head selecting circuit.

BRIEF DESCRIPTION OF THE DRAWINGS

FIGS. 8A through 8E are waveform diagrams showing an inter terminal voltage in writing of a pair of a first and a second high capacity input/output terminal according to Embodiment 1;

FIGS. 16A through 16E are waveform diagrams showing an inter terminal voltage in writing of a pair of a first and a second lower level input/output terminals.

DESCRIPTION OF THE PREFERRED EMBODIMENTS

Embodiment 1

Figure 1:
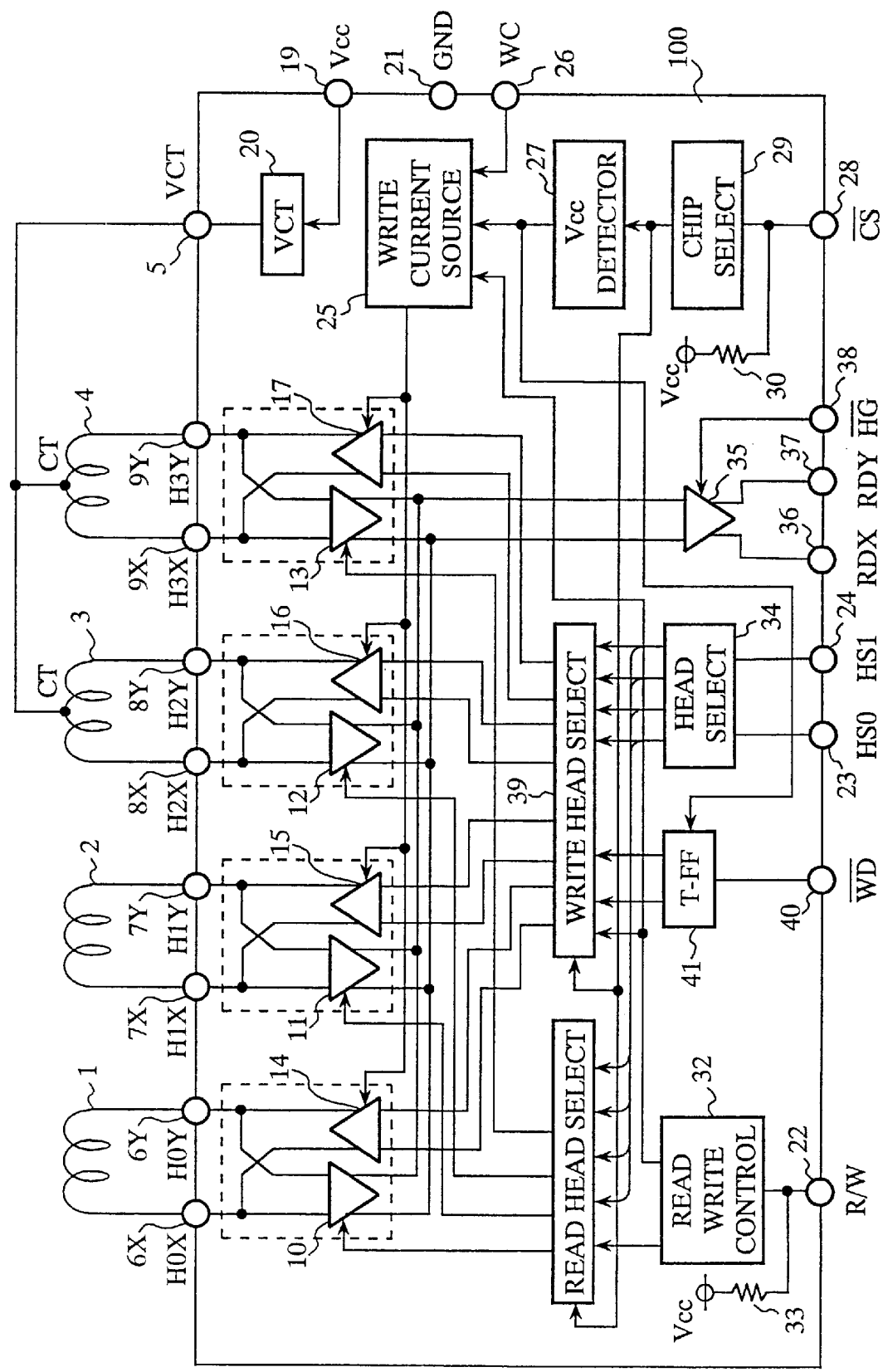
FIG. 1 is a block diagram showing Embodiment 1 of the present invention.

FIG. 1 through FIG. 7 show Embodiment 1 of the present invention. An explanation will be given of Embodiment 1 in reference to FIG. 1 through FIG. 7 as follows. In FIG. 1, numeral 100 designates a semiconductor integrated circuit device for reading and writing, numerals 1 and 2 designate so-called two terminals type write/read coils (hereinafter, referred to as high capacity write/read coil) having no center tap of write/read heads in a first and a second high capacity magnetic head for writing and reading to and from a high capacity record medium. The high capacity record medium may be a floppy disk having a storage capacity of 100 M or more such as a floppy disk of 3.5 inch size having a storage capacity of 100 M, a floppy disk of 3.5 inch size having a storage capacity of 200 M or the like. In respect of the first and the second high capacity magnetic heads, the line density of data recorded on the high capacity record medium is very high and data must be written finely and therefore, a head provided with a thin film head with a write/read coil having small inductance (small turn number of coil), is used. The high capacity write/read coil 1 is for the surface of the high capacity record medium and the high capacity write/read coil 2 is for the rear face of the high capacity record medium.

Numerals 3 and 4 designate so-called three terminals type write/read coils (hereinafter, referred to as lower level write/read coil) having center taps of write/read heads in a first and a second lower level magnetic head for writing and reading to and from a lower level record medium. The lower level record medium may be a floppy disk of 3.5 inch size having a storage capacity of 1 M (250 kbps), a floppy disk of 3.5 inch size having a storage capacity of 1 M (300 kbps), a floppy disk of 3.5 inch size having a storage capacity of 1.6 M, a floppy disk of 3.5 inch size having a storage capacity of 2 M (effective storage capacity of 1.44 M) or the like. In respect of the first and the second lower level magnetic heads, the line density of data recorded to the lower level record medium is low and therefore, a ferrite head having large inductance of a write/read coil (large turn number of coil) is used to facilitate writing. The lower level write/read coil 3 is for the surface of the lower level record medium and the lower level write/read coil 4 is for the rear face of the lower level record medium.

Figure 2:
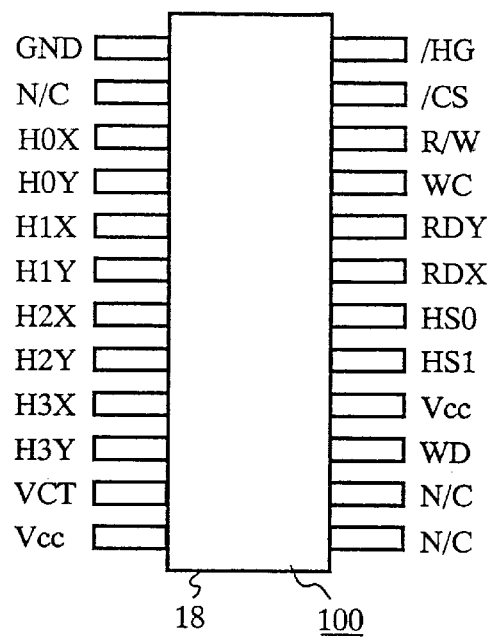
FIG. 2 is an outlook plane view showing Embodiment 1 of the present invention.

Numeral 5 designates a center tap terminal provided to the semiconductor integrated circuit device 100 for outputting a center tap voltage VCT and the center tap terminal 5 is electrically connected to the center taps CT of the lower level write/read coils 3 and 4. The center tap terminal 5 is a lead terminal VCT projected from a resin 18 for molding a semiconductor chip as shown in FIG. 2. Further, an output from a center tap voltage generating circuit 20 is applied to the center tap terminal 5. The center tap voltage generating circuit 20 is a regulator for outputting the center tap voltage VCT that is a constant voltage by receiving a power source potential Vcc applied to a power source potential terminal 19 (lead terminal Vcc shown in FIG. 2). The power source potential Vcc is 5V10% and the center tap voltage VCT is about 4.5 V.

Further, the power source potential Vcc may directly be applied to the center taps CT of the lower level write/read coils 3 and 4. In this case, the center tap terminal 5 and the center tap voltage generating circuit 20 are not necessary in the semiconductor integrated circuit device 100.

Notations 6X and 6Y designate high capacity input/output terminals H0X and H0Y installed on the semiconductor integrated circuit device 100 to which the high capacity write/read coil 1 is connected and the high capacity input/output terminals H0X and H0Y constitute a first pair of high capacity input/output terminals 6. Notations 7X and 7Y designate high capacity input/output terminals H1X and H1Y provided to the semiconductor integrated circuit device 100 to which the high capacity write/read coil 2 is connected and the high capacity input/output terminals H1X and H1Y constitute a second pair of high capacity input/output terminals 7. Notations 8X and 8Y designate lower level input/output terminals installed on the semiconductor integrated circuit device 100 to which the lower level write/read coil 3 is connected and the lower level input/output terminals H2X and H2Y constitute a first pair of lower level input/output terminals 8. Notations 9X and 9Y designate lower level input/output terminals H3X and H3Y installed on the semiconductor integrated circuit device 100 to which the lower level write/read coil 104 is connected and the lower level input/output terminals H3X and H3Y constitute a second pair of lower level input/output terminals 9. The high capacity input/output terminals 6X, 6Y, 7X and 7Y and the lower level input/output terminals 8X, 8Y, 9X and 9Y are lead terminals H0X, H0Y through H3X, H3Y projected from the resin 18 as shown in FIG. 2.

Numeral 10 designates a first high capacity read amplifier, a pair of input nodes of which are connected to the first pair of high capacity input/output terminals 6 and numeral 11 designates a second high capacity read amplifier, a pair of input nodes of which are connected to the second pair of high capacity input/output terminals 7.

Figure 3:
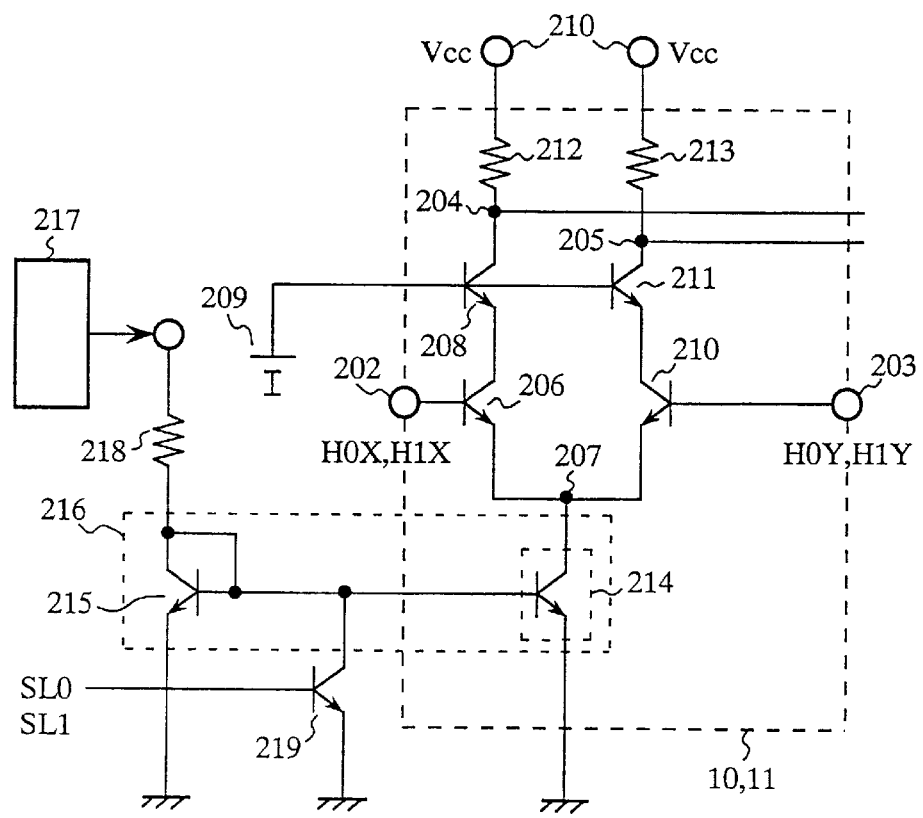
FIG. 3 is a circuit diagram showing a first and a second high capacity read amplifier 10 and 11 according to Embodiment 1.

The first and the second high capacity read amplifiers 10 and 11 are respectively provided with the constitution shown in FIG. 3.

In FIG. 3, numeral 201 designates internal power source potential nodes to which an internal voltage Vc is applied, numeral 202 designates an input node to which a corresponding one of the input/output terminals 6X and 7X is connected, numeral 203 designates an input node to which a corresponding one of the input/output terminals 6Y and 7Y is connected and numerals 204 and 205 designate output nodes.

Numeral 206 designates an NPN type bipolar transistor the base electrode of which is connected to the input node 202, the emitter electrode of which is connected to a common connection point 207 and the collector electrode of which is connected to the output node 204 via an NPN type bipolar transistor 208 for bias. In respect of the transistor 208, the base electrode is applied with a positive bias potential from a bias power source 209, the emitter electrode is connected to the collector electrode of the transistor 206 and the collector electrode is connected to the output node 204. Numeral 210 designates an NPN type bipolar transistor the base electrode of which is connected to the input node 203, the emitter electrode of which is connected to the common connection point 207 and the collector electrode of which is connected to the output node 205 via an NPN type bipolar transistor 211 for bias and the transistor 210 constitutes a differential pair of transistors along with the transistor 206. In respect of the transistor 211, the base electrode is applied with the positive bias potential from the bias power source 209, the emitter electrode is connected to the collector electrode of the transistor 210 and the collector electrode is connected to the output node 205. Numeral 212 designates a load element comprising a resistor element connected between the internal power source potential node 201 and the output node 204 and numeral 213 designates a load element comprising a resistor element connected between the internal power source potential node 201 and the output node 205.

Numeral 214 designates a constant current source connected between the common connection point 207 and the ground potential node and the constant current source 214 is constituted by an NPN type bipolar transistor. The constant current source 214 is controlled by head designating signals SL0 and SL1 (SL0 is for the first high capacity read amplifier 10 and SL1 is for the second high capacity read amplifier 11). Further, the ground potential node is electrically connected to the ground potential terminal 21 shown in FIG. 1 (lead terminal GND shown in FIG. 2).

That is, when the head designating signals SL0 and SL1 signify "no designation", the constant current source 214 brings the common potential point 207 into an electrically floating state by which the read amplifiers 10 and 11 are brought into a deactivated state. When the head designating signals SL0 and SL1 signify "designation", the constant current source 214 performs operation of drawing constant current from the common potential point 207 to the ground potential node by which the read amplifiers 10 and 11 are brought into an activated state.

Although details will be mentioned later, the head designating signals SL0 and SL1 are formed based on a read/write signal R/W inputted to a read/write signal input terminal 22 shown in FIG. 1 (lead terminal R/W shown in FIG. 2) and head select signals HS0 and HS1 inputted to head select signal input terminals 23 and 24 shown in FIG. 1 (lead terminals HS0 and HS1 shown in FIG. 2). The head designating signals SL0 and SL1 become signals signifying "no designation", or "H" level signals in this example, when the head select signals HS0 and HS1 signify "no selection" and when the read/write signal R/W signifies "write" even if the head select signals HS0 and HS1 signify "selection". Further, the head designating signals SL0 and SL1 become signals signifying "designation", or signals of "L" level in this example when the head select signals HS0 and HS1 signify "designation" and the read/write signal R/W signifies "read".

The high capacity read amplifiers 10 and 11 are constituted by the transistors 206, 208, 210 and 211, the load elements 212 and 213 and the constant current source 214.

According to the transistors 206, 208, 210 and 211, particularly to the transistors 206 and 210 constituting the differential pair, the area of the emitter is reduced by forming a comb-like shape to improve S/N ratio.

Numeral 215 designates an NPN type bipolar transistor for making the constant current source 214 flow constant current and constitutes a current mirror circuit 216 along with the NPN type bipolar transistor of the constant current source 214. In respect of the transistor 215, the collector electrode and the base electrode are commonly connected and are connected to the base electrode of the transistor 214 and the emitter electrode is connected to the ground potential node. The transistor 215 constitutes an input side transistor of the current mirror circuit 216 and the transistor 214 constitutes an output side transistor of the current mirror circuit 216.

Numeral 217 designates a constant current supply circuit for supplying collector current that is a constant current to the transistor 215 via a resistor element 218.

Numeral 219 designates a constant current source control circuit for controlling an activated state and a deactivated state of the constant current source 214 by receiving the head designating signals SL0 and SL1 and the constant current source control circuit 219 is constituted by an NPN type bipolar transistor. In respect of a transistor 219 constituting the constant current source control circuit, the head electrode receives the head designating signals SL0 and SL1, the collector electrode is connected to the base electrode of the transistor constituting the constant current source 214 and the emitter electrode is connected to the ground potential node. The constant current source control circuit 219 brings the constant current source 214 into a deactivated state, that is, brings the transistor 214 into a nonconductive state by setting the base potential of the transistor constituting the constant current source 214 to the ground potential when the head designating signals SL0 and SL1 signify "no designation" ("H" level in this example). Further, when the head designating signals SL0 and SL1 signify "designation" ("L" level in this example), the constant current source control circuit 219 brings the constant current source 214 into an activated state, that is, in a state where no influence is effected on the transistor constituting the constant current source 214.

Incidentally, the transistors 215 and 219 are fabricated by a fabrication process the same as those for transistors 206, 208, 210, 211 and 214.

Further, the transistors 206 and 210 perform amplifying operation by being controlled based on the potential difference between the input nodes 202 and 203 to which the potential differences between both ends of the high capacity write/read coils 1 and 2 generated based on data recorded on a record medium via the high capacity input/output terminals 6 and 7.

That is, the transistors 206 and 210 amplify the potential difference between the input nodes 202 and 203 and output the amplified potential difference to between the output nodes 204 and 205. That is, the conductivities of the transistor 206 and the transistor 210 are changed in accordance with the potential difference between the input nodes 202 and 203. Current flows from the internal power source potential node 201 to the ground potential node via the resistor element 212, the transistor 208, the transistor 206, the common connection point 207 and the constant current source 214 based on the conductivity of the transistor 206 and the potential in accordance with the current is generated at the output node 204. Meanwhile, current flows from the internal power source potential node 201 to the ground potential node via the resistor element 213, the transistor 211, the transistor 210, the common connection point 207 and the constant current source 214 based on the conductivity of the transistor 206 and the potential in accordance with the current is generated at the output node 204.

Referring back to FIG. 1, numeral 12 designates a first lower level read amplifier, a pair of input nodes of which are connected to the first pair of lower level input/output terminals 8 and numeral 13 designates a second lower level read amplifier, a pair of input nodes of which are connected to the second pair of lower level input/output terminals 9.

Figure 4:
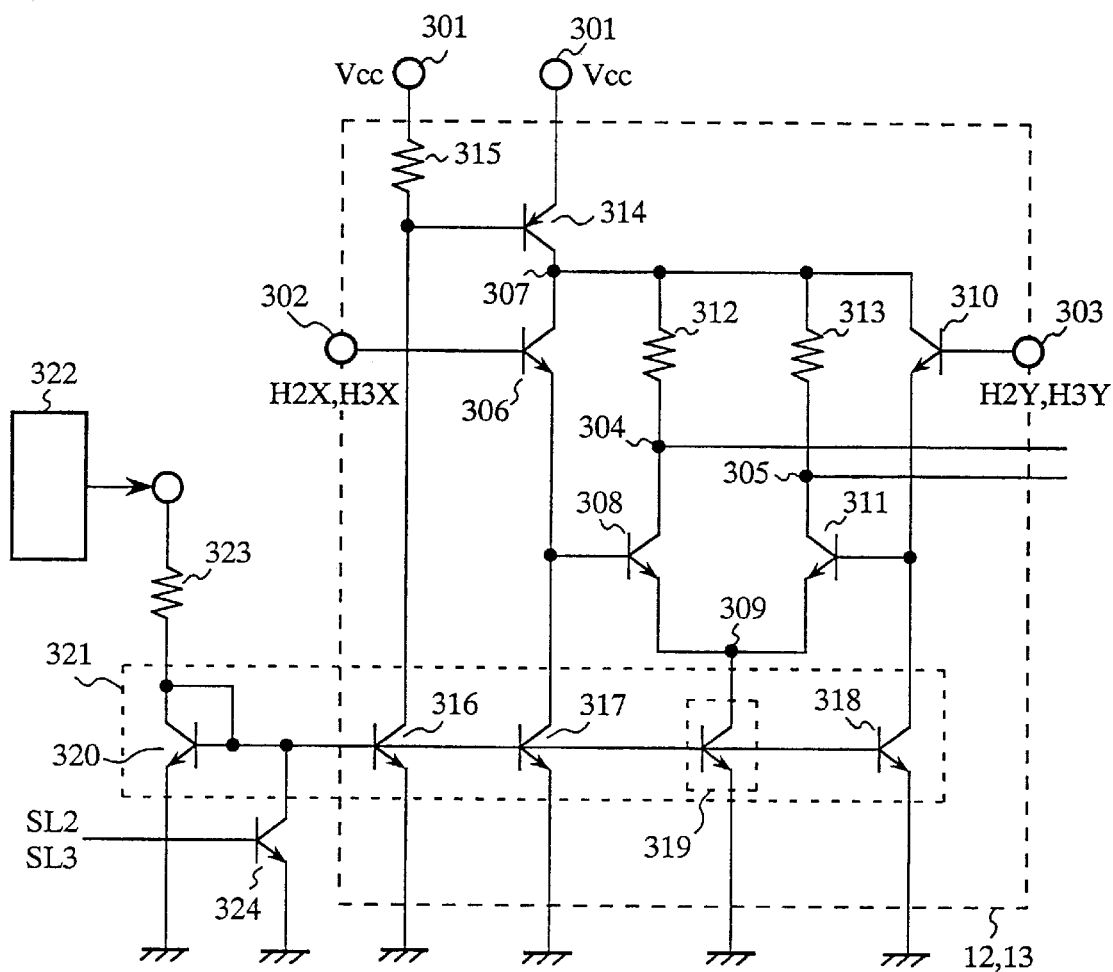
FIG. 4 is a circuit diagram showing a first and a second lower level read amplifier 12 and 13 according to Embodiment 1.

The first and the second lower level read amplifiers 12 and 13 are respectively provided with the constitution shown in FIG. 4.

In FIG. 4, numeral 301 designates internal power source potential nodes to which the internal voltage Vc is applied and the internal power source potential nodes 301 are electrically connected to the internal power source potential nodes 201. Numeral 302 designates an input node to which a corresponding one of the input/output terminals 8X and 9X is connected, numeral 303 designates an input node to which a corresponding one of the input/output terminals 8Y and 9Y is connected and numerals 304 and 305 designate output nodes.

Numeral 306 designates a transistor for promoting withstand voltage comprising an NPN type bipolar transistor the base electrode of which is connected to the input node 302 and the collector electrode of which is connected to a common power source supply point 307 and the transistor 306 functions as a diode element where the PN junction between the base and the emitter is connected to the input node 302. Numeral 308 designates an NPN type bipolar transistor the base electrode of which is connected to the emitter electrode of the transistor 306, the emitter electrode of which is connected to a common connection point 309 and the collector electrode of which is connected to the output node 304 and the base electrode is connected via the transistor 306 which functions as a diode element.

Numeral 310 designates a transistor for promoting withstand voltage comprising an NPN type bipolar transistor, the base electrode of which is connected to the input node 303 and the collector electrode of which is connected to the common power source supply point 307 and the transistor 310 functions as a diode element where the PN junction between the base and the emitter is connected to the input node 303. Numeral 311 designates an NPN type bipolar transistor the base electrode of which is connected to the emitter electrode of the transistor 310, the emitter electrode of which is connected to the common connection point 309 and the collector electrode of which is connected to the output node 305 where the base electrode is connected via the transistor 310 which functions as a diode element and the transistor 311 constitutes a differential pair of transistors along with the transistor 308.

Numeral 312 designates a load element comprising a resistor element connected between the common power source supply point 307 and the output node 304 and numeral 313 designates a load element comprising a resistor element connected between the common power source supply point 307 and the output node 305.

Numeral 314 designates a transistor for supplying power source comprising an NPN type bipolar transistor the base electrode of which is connected to the internal power source potential node 301 via a resistor element 315, the emitter electrode of which is connected to the internal power source potential node 301 and the collector electrode of which is connected to the common power source supply point 307 and the transistor 314 is a transistor for stabilizing a voltage at the common power source supply point 307.

Numeral 316 designates a transistor for drawing current comprising an NPN type bipolar transistor the emitter electrode of which is connected to the ground potential node and the collector electrode of which is connected to the resistor element 315 and is a transistor for drawing constant current from a connection point connecting the resistor element 315 and the base electrode of the transistor 314.

Numeral 317 designates a transistor for drawing current comprising an NPN type bipolar transistor the emitter electrode of which is connected to the ground potential node and the collector electrode of which is connected to the emitter electrode of the transistor 306 and is a transistor for drawing constant current from a connection point connecting the emitter electrode of the transistor 306 and the base electrode of the transistor 308. Numeral 318 designates a transistor for drawing current comprising an NPN type bipolar transistor the emitter electrode of which is connected to the ground potential node and the collector electrode of which is connected to the emitter electrode of the transistor 310 and is a transistor for drawing constant current from a connection point connecting the emitter electrode of the transistor 310 and the base electrode of the transistor 311.

Numeral 319 designates a constant current source connected between the common connection point 309 and the ground potential node and the constant current source 319 is constituted by an NPN type bipolar transistor. The constant current source 319 is controlled by the head designating signals SL2 and SL3 (SL2 is for the first lower level read amplifier 12 and SL3 is for the second lower level read amplifier 13).

That is, when the head designating signals SL2 and SL3 signify "no designation", the constant current source 319 brings the common potential point 309 into an electrically floating state by which the read amplifiers 12 and 13 are brought into a deactivated state. When the head designating signals SL2 and SL3 signify "designation", the constant current source 319 performs operation of drawing constant current from the constant potential point 309 to the ground potential node by which the read amplifiers 12 and 13 are brought into an activated state.

Although details will be mentioned later, the head designating signals SL2 and SL3 are formed based on the read/write signal R/W inputted to the read/write signal input terminal 22 shown in FIG. 1 and the head select signals HS0 and HS1 inputted to the head select signal input terminals 23 and 24 shown in FIG. 1. That is, the head designating signals SL2 and SL3 become signals signifying "no designation", or signals of "H" level in this example when the head select signals HS0 and HS1 signify "no selection" and when the read/write signal R/W signifies "write" even if the head select signals HS0 and HS1 signify "selection". Further, the head designating signals SL2 and SL3 become signals signifying "designation", or signals of "L" level in this example when the head select signals HS0 and HS1 signify "designation" and the read/write signal R/W signifies "read".

The transistors 306, 308, 310, 311, 314, 316, 317 and 318, the load elements 312 and 313, the resistor element 315 and the constant current source 319 constitute the lower level read amplifiers 12 and 13. The transistors 306, 308, 310, 311, 314, 316, 317 and 318 are fabricated by a fabrication process the same as those of the transistors 206, 208, 210 and 211 constituting the high capacity read amplifiers 10 and 11.

Also the transistors 308 and 311 constituting the differential pair in the lower level read amplifiers 12 and 13, are provided with low withstand voltage similar to the transistors 206 and 210 constituting the differential pair in the high capacity read amplifiers 10 and 11. However, the bases and the emitters of the transistors 306 and 310 are connected between the base electrodes of the transistors 308 and 311 constituting the differential pair and the input nodes 302 and 303 and therefore, the pairs of transistors 308 and 306, and 311 and 310 are not destructed until the potential differences between the input nodes 302 and 303 and the common connection point 309 become at least 2BVEBO. Incidentally, the notation BVEBO designates the withstand voltage between the bases and the emitters of the transistors 308, 306, 311 and 310.

Accordingly, as a result, the withstand voltages of the input transistors constituted by the transistors 308 and 306 and the input transistors constituted by the transistors 311 and 310 in the lower level read amplifiers 12 and 13, are promoted. In other words, the input transistors are provided with the withstand voltage twice as much as those of the input transistors 206 and 210 in the high capacity read amplifiers 10 and 11.

Numeral 320 designates an NPN type bipolar transistor for making the constant current source 319, the transistors 316, 317 and 318 for drawing current flow constant current and constitutes a current mirror circuit 321 along with the respective NPN type bipolar transistors constituting the constant current source 319, the transistors 316, 317 and 318 for drawing current. According to the transistor 320, the collector electrode and the base electrode are commonly connected and connected to the base electrodes of the transistors 316, 317, 318 and 319, and the emitter electrode is connected to the ground potential node. The transistor 320 constitutes an input side transistor of the current mirror circuit 321 and the respective transistors 316, 317, 318 and 319 constitute output side transistors of the current mirror circuit 321.

Numeral 322 designates a constant current supply circuit for supplying collector current that is a constant current to the transistor 320 via a resistor element 323.

Numeral 324 designates a constant current source control circuit for controlling an activated state and a deactivated state of the constant current source 319, and the transistors 316, 317 and 318 for drawing current by receiving the head designating signals SL2 and SL3 and is constituted by an NPN type bipolar transistor. In respect of the transistor constituting the constant current source control circuit 324, the base electrode receives the head designating signals SL2 and SL3, the collector electrode is connected to the base electrodes of the transistors constituting the constant current source 319 and the transistors 316, 317 and 318 for drawing current and the emitter electrode is connected to the ground potential node.

The constant current control circuit 324 brings the constant current source 319, the transistors 316, 317 and 318 for drawing current into a deactivated state, that is, brings the transistors 316, 317, 318 and 319 into a nonconductive state by setting the base potentials of the transistors constituting the constant current source 319 and the transistors 316, 317 and 318 for drawing current to the ground potential when the head designating signals SL2 and SL3 signify "no designation" ("H" level in this example). Further, when the head designating signals SL2 and SL3 signify "no designation"

("L" level in this example), the constant current control circuit 324 brings the constant current source 319, and the transistors 316, 317 and 318 for drawing current into an activated state, that is, in a state where no influence is effected on the transistors constituting the constant current source 319, and the transistors 316, 317 and 318 for drawing current.

Further, also the transistors 320 and 324 are fabricated by a fabrication process the same as those of the transistors 206, 208, 210, 211 and 214 constituting the high capacity read amplifiers 10 and 11.

Further, the transistors 306 and 311 perform amplifying operation by being controlled based on the potential difference between the input nodes 302 and 303 to which the potential differences between both ends of the lower level write/read coils 3 and 4 generated based on data recorded on a record medium are inputted via the lower level input/output terminals 8 and 9.

That is, the transistors 306 and 311 amplify the potential difference between the input nodes 302 and 303 and output the amplified potential difference to the output nodes 304 and 305. That is, the conductivities of the transistor 308 and the transistor 311 are changed in accordance with the potential difference between the input nodes 302 and 303. Current flows from the internal power source potential node 301 to the ground potential node via the transistor 314, the common power source supply point 307, the resistor element 312, the transistor 308, the common connection point 309 and the constant power source 319 based on the conductivity of the transistor 308 and the potential in accordance with the current is generated at the output node 304. Meanwhile, current flows from the internal power source potential node 301 to the ground potential node via the transistor 314, the common power source supply point 307, the resistor element 313, the transistor 311, the common connection point 309 and the constant current source 319 based on the conductivity of the transistor 308 and the potential in accordance with the current is generated at the output node 304.

Referring back to FIG. 1, numeral 14 designates a first high capacity write driver, a pair of output nodes of which are connected to the first pair of high capacity input/output terminals 6 and numeral 15 designates a second high capacity write driver, a pair of output nodes of which are connected to the second pair of high capacity input/output terminals 7.

Figure 5:
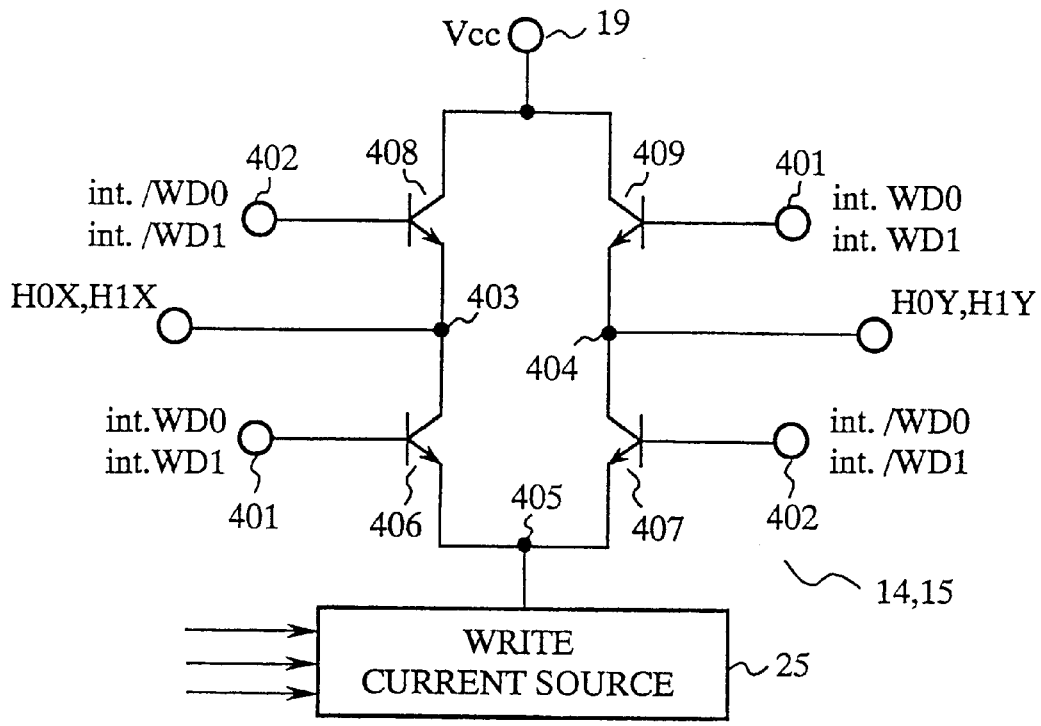
FIG. 5 is a circuit diagram showing a first and a second high capacity write driver 14 and 15 according to Embodiment 1.

The first and the second high capacity write drivers 14 and 15 are respectively provided with the constitution shown in FIG. 5.

In FIG. 5, numeral 401 designates an input node to which internal write signals int.WD0 and int.WD1 are inputted and numeral 402 designates an input node to which internal write signals int./WD0 and int./WD1 that are inverted signals of the internal write signals int.WD0 and int.WD1 are inputted and the input node 402 constitutes a pair of input nodes along with the input node 401. Numeral 403 designates an output node to which a corresponding one of the input/output terminals 6X and 7X is connected and numeral 404 designates an output node to which a corresponding one of the input/output terminals 6Y and 7Y is connected and the output node 404 constitutes a pair of output nodes along with the output node 403.

Numeral 406 designates an NPN type bipolar transistor the base electrode of which is connected to the input node 401, the emitter electrode of which is connected to a common connection point 405 and the collector electrode of which is connected to the output node 403, numeral 407 designates an NPN type bipolar transistor the base electrode of which is connected to the input node 402, the emitter electrode of which is connected to the common connection point 405 and the collector electrode of which is connected to the output node 404, numeral 408 designates an NPN type bipolar transistor the base electrode of which is connected to the input node 402, the emitter electrode of which is connected to the output node 403 and the collector electrode of which is connected to the power source potential node 19 and numeral 409 designates an NPN type bipolar transistor the base electrode of which is connected to the input node 401, the emitter electrode of which is connected to the output node 404 and the collector electrode of which is connected to the power source potential node 19.

The transistors 406, 407, 408 and 409 constituting the high capacity write drivers 14 and 15 are also fabricated by a fabrication process the same as those of the transistors 206, 208, 210 and 211 for constituting the high capacity read amplifiers 10 and 11.

Incidentally, the common connection point 405 is connected to a write current circuit 25 (details will be mentioned later) and predetermined current is drawn by the write current circuit 25.

Further, in respect of the transistors 406 and 409, the conductive state and the nonconductive state are similarly controlled by the internal write signals int.WD0 and int.WD1 and in respect of the transistors 407 and 408, the conductive state and the nonconductive state are similarly controlled by the internal write signals int./WD0 and int./WD1. As a result, the transistors 406 and 409 are controlled based on the internal write signals int.WD0, int.WD1, int./WD0 and int./WD1 and current flows from the power source potential node 19 to the common connection point 405 via the transistor 409, the output node 404, the input/output terminal 6Y or 7Y, the high capacity write/read coil 1 or 2, the input/output terminal 6X or 7X, the output node 403 and the transistor 406, or via the transistor 408, the output node 403, the input/output terminal 6X or 7X, the high capacity write/read coil 1 or 2, the input/output terminal 6Y or 7Y, the output node 404 and the transistor 407, and predetermined current is drawn to the current supply circuit 25.

Referring back to FIG. 1, numeral 16 designates a first lower level write driver, a pair of output nodes of which are connected to the first pair of lower level input/output terminals 8 and numeral 17 designates a second lower level write driver, a pair of output nodes of which are connected to the second pair of lower level input/output terminals 7.

Figure 6:
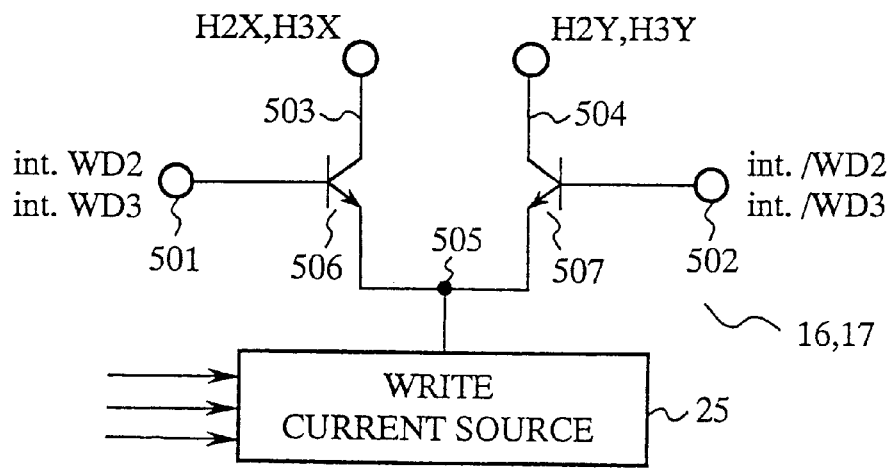
FIG. 6 is a circuit diagram showing a first and a second lower level write driver 16 and 17 according to Embodiment 1.

The first and the second lower level write drivers 16 and 17 are respectively provided with the constitution shown in FIG. 6.

In FIG. 6, numeral 501 designates an input node to which the internal write signal int.WD is inputted and numeral 502 designates an input node to which the internal write signal int./WD that is an inverted signal of the internal write signal int.WD is inputted and the input node 502 constitutes a pair of input nodes along with the input node 501. Numeral 503 designates an output node to which the input/output terminal 8X or 9X is connected and numeral 504 designates an output node to which the input/output terminal 8Y or 9Y is connected and the output node 504 constitutes a pair of output nodes along with the output node 503.

Numeral 506 designates an NPN type bipolar transistor the base electrode of which is connected to the input node 501, the emitter electrode of which is connected to a common connection point 505 and the collector electrode of which is connected to the output node 503 and numeral 507 designates an NPN type bipolar transistor the base electrode of which is connected to the input node 502, the emitter electrode of which is connected to the common connection point 505 and the collector electrode of which is connected to the output node 504 and the transistor 507 constitutes a differential pair of transistors along with the transistor 506.

The transistors 506 and 507 constituting the lower level write drivers 16 and 17 are also fabricated by a fabrication process the same as those of the transistors 206, 208, 210 and 211 constituting the high capacity read amplifiers 10 and 11.

Incidentally, the common connection point 505 is connected to the write current circuit 25 and a predetermined current is drawn by the write current circuit 25.

Further, the transistor 506 is controlled based on an internal write signals int.WD0, int.WD1, int./WD0 and int./WD1 and current flows from a center tap terminal of the lower level write/read coil 3 or 4 receiving the center tap voltage VCT to the common connection point 505 via the lower level write/read coil 3 or 4, the input/output terminal 6X or 7X, the output node 503, the transistor 506, or via the lower level write/read coil 3 or 4, the input/output terminal 6Y or 7Y, the output node 504 and the transistor 507 and the predetermined current is drawn to the current supply circuit 25.

In FIG. 1, numeral 25 designates the write current supply circuit for drawing current having a predetermined current value from the common connection point 405 (refer to FIG. 5) for the high capacity write driver 14 or 15 and from the common connection point 505 (refer to FIG. 6) for the lower level write driver 16 or 17 based on the read/write signal R/W inputted to the read/write signal input terminal 22, a power source potential detect signal and the write current control signal WC inputted to a write current control signal input terminal 26 (lead terminal WC shown in FIG. 2).

The write current supply circuit 25 brings the common connection point 405 of the high capacity write driver 14 or 15 and the common connection point 505 of the lower level write driver 16 or 17 into an electrically floating state respectively when the read/write signal R/W signifies "read" and when the power source potential detect signal signifies "power source potential Vcc below predetermined potential".

Further, the write current supply circuit 25 draws current having a current value designated by the write current control signal WC from the common connection point 405 of the high capacity write driver 14 or 15 and the common connection point 505 of the lower level write driver 16 or 17 when the read/write signal R/W signifies "write" and the power source potential detect signal signifies "power source potential Vcc at predetermined potential or higher".

The write current control signal WC is a signal instructing the write current supply circuit 25 to draw from the common connection point 405 of the high capacity write driver 14 or 15 and from the common connection point 505 of the lower level write driver 16 or 17, the lowest current value, for example, about 10 mA when the writing operation is performed on the inner peripheral side of a high capacity record medium, a current value a little higher than the current value in the case of the inner peripheral side, for example, about 11 through 12 mA when the writing operation is performed on the outer peripheral side of a high capacity record medium, a current value substantially 5 through 6 times as much as the current value in the case of a high capacity record medium, for example, about 60 mA when the writing operation is performed on a lower level record medium.

Numeral 27 designates a power source potential detect circuit activated based on a chip select signal/CS inputted to a chip select signal input terminal 28 (lead terminal/CS shown in FIG. 2) for detecting the power source potential Vcc applied to the power source potential input terminal 19 and outputting a power source potential detect signal signifying whether the power source potential Vcc is less than predetermined potential or equal to or higher than the predetermined potential to the write current supply circuit 25.

Numeral 29 designates an input buffer circuit for chip select signal for receiving the chip select signal/CS inputted to the chip select signal input terminal 28 and outputting an internal chip select signal int./CS in synchronism with the chip select signal/CS (referred to as chip select signal/CS except special case).

Numeral 30 designates a chip select signal protecting circuit comprising a pull-up resistor element connected between the power source potential input terminal 19 and the chip select signal input terminal 28, which maintains the potential of the input node in the input buffer circuit 29 for chip select signal at a potential signifying "no selection", or at "H" level in this example, except the case where the chip select signal/CS signifies "selection", or a signal at "L" level in this example.

Numeral 31 designates a selecting circuit for read amplifier activated based on the chip select signal/CS and the read/write signal R/W for forming the head designating signals SL0 through SL3 based on the head selection decode signal and outputting the head designating signals SL0 through SL3 to a corresponding one of the high capacity read amplifiers 10 and 11 and a corresponding one of the lower level read amplifiers 12 and 13.

The selecting circuit 31 for read amplifier outputs a signal signifying that all of the head designating signals SL0 through SL3 are "not designated", or a signal at "H" level in this example, when the chip select signal/CS signifies "no selection", or when even if the chip select signal/CS signifies "selection", the read/write signal R/W signifies "write".

Further, the selecting circuit 31 for read amplifier outputs a signal signifying that either one of the head designating signals SL0 through SL3 is "designated" based on the head selection decode signal, or a signal at "L" level in this example and also signifying that the residual ones of the head designating signals are "not designated", when the chip select signal/CS signifies "selection" and the read/write signal R/W signifies "read".

Figure 7:
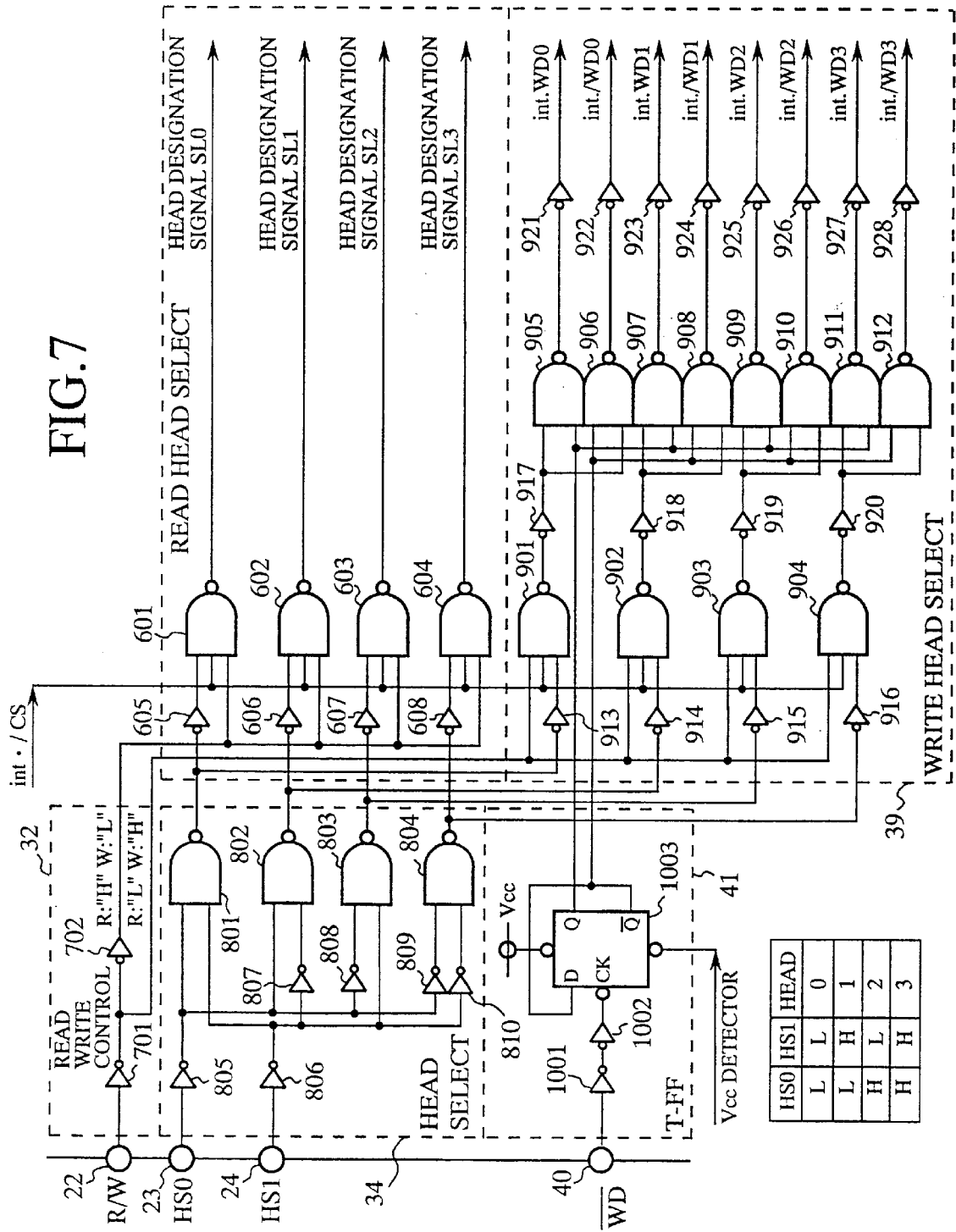
FIG. 7 is a circuit diagram showing a selecting circuit 31 for read amplifier, an input buffer circuit 32 for read/write signal, a head selecting circuit 34, a write data forming circuit 39 and an input buffer circuit 41 for write signal in Embodiment 1.

As shown in FIG. 7, in this example the selecting circuit 31 for read amplifier is constituted by 4 of 3 inputs NAND circuits 601 through 604 and 4 of inverter circuits 605 through 608.

The NAND circuit 601 is supplied with the internal chip select signal int./CS from the input buffer circuit 29 for chip select signal, an inverting signal of the read/write signal R/W and a corresponding one of the head selection decode signal inputted via the inverter circuit 605 and outputs the head designating signal SL0 for the first high capacity read amplifier 10.

The NAND circuit 602 is supplied with the internal chip select signal int./CS from the input buffer circuit 29 for chip select signal, the noninverting signal of the read/write signal R/W and a corresponding one of the head selection decode signal inputted via the inverter circuit 606 and outputs the head designating signal SL1 for the second high capacity read amplifier 11.

The NAND circuit 603 is supplied with the internal chip select signal int./CS from the input buffer circuit 29 for chip select signal, the noninverting signal of the read/write signal R/W and a corresponding one of the head selection decode signal inputted via the inverter circuit 607 and outputs the head designating signal SL2 for the first lower level read amplifier 12.

The NAND circuit 604 is supplied with the internal chip select signal int./CS from the input buffer circuit 29 for chip select signal, the noninverting signal of the read/write signal R/W and a corresponding one of the head selection decode signal inputted via the inverter circuit 608 and outputs the head designating signal SL3 for the second lower level read amplifier 13.

In this example, each of the NAND circuits 601 through 604, outputs a signal at "H" level regardless of the value of the head selection decode signal when at least one of the internal chip select signal int./CS and the noninverting signal of the read/write signal R/W are at "L" level and outputs a signal at "H" level or "L" level in accordance with the value of the head selection decode signal when both of them are at "H" level.

Numeral 32 designates an input buffer circuit for read/write signal for receiving the read/write signal R/W inputted to the read/write signal input terminal 22 and outputting inverting signal and noninverting signal in synchronism with the read/write signal R/W. The inverting signal from the input buffer circuit 32 is outputted to the write current supply circuit 25 and the noninverting signal is outputted to the selecting circuit 31 for read amplifier.

The input buffer circuit 32 is constituted by two stages of inverter circuits 701 and 702 connected as shown in FIG. 7.

The input node of the inverter circuit 701 is connected to the read/write signal input terminal 22 and outputs an inverting signal from the output node.

The input node of the inverter circuit 702 is connected to the output node of the inverter circuit 701 and outputs a noninverting signal from the output node.

Numeral 33 designates a read/write signal protecting circuit comprising a pull-up resistor element connected between the power source potential input terminal 19 and the read/write signal input terminal 22 and the read/write signal protecting circuit 33 maintains the potential of the input node of the input buffer circuit 32 for read/write signal at a potential signifying "read", or at "H" level in this example, except the case where the read/write signal R/W signifies "write", or the case of signal at "L" level in this example.

Numeral 34 signifies a head selecting circuit for outputting the head selection decode signal of 4 bits in this example by receiving the head selecting signals HS0 and HS1 inputted to the head select signal input terminals 23 and 24.

According to this example, the head selecting circuit 34 outputs the head select signal for setting either one bit of 4 bits to "L" and remaining 3 bits to "H" level based on combinations of the head select signals HS0 and HS1.

As shown in FIG. 7, the head selecting circuit 34 is constituted by 4 of the NAND circuits 801 through 804 and 6 of inverter circuits 805 through 810.

The NAND circuit 801 is supplied with an inverting signal of the head select signal HS0 inputted via the inverter circuit 805 and an inverting signal of the head select signal HS1 inputted via the inverter circuit 806 and outputs the head selection decode signal to a head 0 (corresponding to high capacity write/read coil 1) to the inverter circuit 605 of the selecting circuit 31 for read amplifier.

The NAND circuit 802 is supplied with an inverting signal of the head select signal HS0 inputted via the inverter circuit 805 and a noninverting signal of the head select signal HS1 inputted via the inverter circuits 806 and 807 and outputs the head selection decode signal to a head 1 (corresponding to high capacity write/read coil 2) to the inverter circuit 606 of the selecting circuit 31 for read amplifier.

The NAND circuit 803 is supplied with a noninverting signal of the head select signal HS0 inputted via the inverter circuits 805 and 808 and an inverting signal of the head select signal HS1 inputted via the inverter circuit 806 and outputs the head selection decode signal to a head 2 (corresponding to lower level write/read coil 3) to the inverter circuit 607 of the selecting circuit 31 for read amplifier.

The NAND circuit 804 is supplied with a noninverting signal of the head select signal HS0 inputted via the inverter circuits 805 and 809 and the head select signal HS1 inputted via the inverter circuits 806 and 810 and outputs the head selection decode signal to a head 3 (corresponding to lower level write/read coil 3) to the inverter circuit 608 of the selecting circuit 31 for read amplifier.

The input node of the inverter circuit 805 is connected to the input terminal 23 for head select signal and the output node is connected to the input nodes on one side of the NAND circuits 801 and 802.

The input node of the inverter circuit 806 is connected to the input terminal 24 for head select signal and the output node is connected to the input nodes on the other side of the NAND circuits 801 and 803.

The input node of the inverter circuit 807 is connected to the output node of the inverter circuit 806 and the output node is connected to the input node on the other side of the NAND circuit 802.

The input node of the inverter circuit 808 is connected to the output node of the inverter circuit 805 and the output node is connected to the input node on one side of the NAND circuit 803.

The input node of the inverter circuit 809 is connected to the output node of the inverter circuit 805 and the output node is connected to the input node on one side of the NAND circuit 804.

The input node of the inverter circuit 810 is connected to the output node of the inverter circuit 806 and the output node is connected to the input node on one side of the NAND circuit 804.

Incidentally, a selector is constituted by the selecting circuit 31 for read amplifier and the head selecting circuit 34 for selecting either one of the high capacity read amplifiers 10 and 11 and the lower level read amplifiers 12 and 13 by receiving the head select signals HS0 and HS1.

Numeral 35 designates an amplifying circuit for amplifying outputs from the high capacity read amplifiers 10 and 11 and the lower level read amplifiers 12 and 13 and outputting them to data output terminals 36 and 37 (lead terminals RDX and RDY shown in FIG. 2).

The amplifying circuit 35 is constituted by, for example, a differential amplifying circuit capable of switching the gain to a first gain or a second gain that is larger than the first gain and is substantially 5 times as large as the first gain in this example.

A pair of input nodes of the amplifying circuit 35 are connected to the pair of output nodes (output nodes 204 and 205 shown in FIG. 3) of the high capacity read amplifiers 10 and 11 and the pair of output nodes (output nodes 304 and 305 shown in FIG. 4) of the lower level read amplifiers 12 and 13.

The pair of output nodes of the amplifying circuit 35 are connected to the output terminals 36 and 37.

The gain control node of the amplifying circuit 35 is connected to an input terminal 38 for gain switch signal (lead terminal/HG shown in FIG. 2).

The gain switching operation of the amplifying circuit 35 is carried out by the gain switch signal/HG inputted to the input terminal 38 for gain switch signal.

The gain switch signal comprises a signal signifying "selecting high capacity read amplifier", or a signal at "H" level in this example and a signal signifying "selecting lower level read amplifier", or a signal at "L" level.

The amplifying circuit 35 is provided with the first gain when the gain switch signal/HG at "L" level and the second gain when it is at "H" level.

Numeral 39 designates a write data forming circuit activated based on the chip select signal/CS and the read/write signal R/W for forming internal write signals int.WD0, int./WD0, int.WD1, int./WD1, int.WD2, int./WD2, int.WD3 and int./WD3 based on the head selection decode signal from the head selecting circuit 34 and a write signal/WD inputted to a data input terminal 40 (lead terminal/WD shown in FIG. 2) and outputting them to corresponding one of the high capacity write drivers 14 and 15 and the lower level write drivers 16 and 17.

The write data forming circuit 39 is provided with 4 of pairs of output nodes for outputting the internal write signals int.WD0, int./WD0, int.WD1, int./WD1, int.WD2, int./WD2, int.WD3 and int./WD3 and the respective pairs of output nodes are connected to corresponding ones of pairs of input nodes of the high capacity write drivers 14 and 15 and the lower level write drivers 16 and 17.

The write data forming circuit 39 outputs all of the internal write signals int.WD0, int./WD0, int.WD1, int./WD1, int.WD2, int./WD2, int.WD3 and int./WD3 as signals signifying "no write data", or signals at "L" level in this example when the chip select signal/CS signifies "no selection" or when even if the chip select signal/CS signifies "selection", the read/write signal R/W signifies "read".

Further, the write data forming circuit 39 selects a pair of internal write signals of either one of the internal write signals int.WD0, int./WD0, int.WD1, int./WD1, int.WD2, int./WD2, int.WD3 and int./WD3 based on the head selection decode signal when the chip select signal/CS signifies "selection" and the read/write signal R/W signifies "write" and outputs the selected pair of internal write signals as signals based on the write signal/WD, or as signals where one of the pair of internal write signals is at "H" level and the other is at "L" level in this example and as a signal signifying "no write data" in respect of the remaining internal write signals.

According to the example, as shown in FIG. 7, the write data forming circuit 39 is constituted by 12 of 3 inputs NAND circuits 901 through 904 and 2 inputs NAND circuits 905 through 912 and 16 of inverter circuits 913 through 928.

The NAND circuit 901 is supplied with the internal chip select signal int./CS from the input buffer circuit 29 for chip select signal, an inverting signal of the read/write signal R/W from the input buffer circuit 32 for read/write signal and the corresponding one of the head selection decode signal from the head selecting circuit 34 inputted via the inverter circuit 913 and outputs the head designating signal in respect of the first high capacity write driver 14.

The NAND circuit 902 is supplied with the internal chip select signal int./CS from the input buffer circuit 29 for chip select signal, an inverting signal of the read/write signal R/W from the input buffer circuit 32 for read/write signal and the corresponding one of the head selection decode signal from the head selecting circuit 34 inputted via the inverter circuit 914 and outputs the head designating signal in respect of the second high capacity write driver 15.

The NAND circuit 903 is supplied with the internal chip select signal int./CS from the input buffer circuit 29 for chip select signal, an inverting signal of the read/write signal R/W from the input buffer circuit 32 for read/write signal and the corresponding one of the head selection decode signal from the head selecting circuit 34 inputted via the inverter circuit 915 and outputs the head designating signal in respect of the first lower level write driver 16.

The NAND circuit 904 is supplied with the internal chip select signal int./CS from the input buffer circuit 29 for chip select signal, an inverting signal of the read/write signal R/W from the input buffer circuit 32 for read/write signal and the corresponding one of the head selection decode signal from the head selecting circuit 34 inputted via the inverter circuit 914 and outputs the head designating signal in respect of the second lower level write driver 17.

According to this example, each of the NAND circuits 901 through 904 outputs a signal at "H" level regardless of the value of the head selection decode signal when at least one of the internal chip select signal int./CS and the inverting signal of the read/write signal R/W is at "L" and outputs a signal at "H" level or "L" level in accordance with the value of the head selection decode signal if both are at "H" level.

The NAND circuit 905 is supplied with the head designating signal from the NAND circuit 901 inputted via the inverter circuit 917 and a signal in synchronism with the write signal/WD and outputs the internal write signal int.WD0 to the first high capacity write driver 14 via the inverter circuit 921.

The output node of the inverter circuit 921 is connected to the input node (input node 401 shown in FIG. 5) of the high capacity write driver 14.

The NAND circuit 906 is supplied with the head designating signal from the NAND circuit 901 inputted via the inverter circuit 917 and a signal in synchronism with and inverting the write signal/WD and outputs the internal write signal int./WD0 to the first high capacity write driver 14 via the inverter circuit 922.

The output node of the inverter circuit 922 is connected to the input node (input node 402 shown in FIG. 5) of the high capacity write driver 14.

The NAND circuit 907 is supplied with the head designating signal from the NAND circuit 902 inputted via the inverter circuit 918 and a signal in synchronism with the write signal/WD and outputs the internal write signal int.WD1 to the second high capacity write driver 15 via the inverter circuit 923.

The output node of the inverter circuit 923 is connected to the input node (input node 401 shown in FIG. 5) of the high capacity write driver 15.

The NAND circuit 908 is supplied with the head designating signal from the NAND circuit 902 inputted via the inverter circuit 918 and a signal in synchronism with and inverting the write signal/WD and outputs the internal write signal int./WD1 to the second high capacity write driver 15 via the inverter circuit 924.

The output node of the inverter circuit 924 is connected to the input node (input node 402 shown in FIG. 5) of the high capacity write driver 15.

The NAND circuit 909 is supplied with the head designating signal from the NAND circuit 903 inputted via the inverter circuit 919 and a signal in synchronism with the write signal/WD and outputs the internal write signal int.WD2 to the first lower level write driver 16 via the inverter circuit 925.

The output node of the inverter circuit 925 is connected to the input node (input node 501 shown in FIG. 6) of the first lower level write driver 16.

The NAND circuit 910 is supplied with the head designating signal from the NAND circuit 903 inputted via the inverter circuit 919 and a signal in synchronism with and inverting the write signal/WD and outputs the internal write signal int.WD2 to the first lower level write driver 16 via the inverter circuit 926.

The output node of the inverter circuit 926 is connected to the input node (input node 502 shown in FIG. 6) of the lower level write driver 16.

The NAND circuit 911 is supplied with the head designating signal from the NAND circuit 904 inputted via the inverter circuit 920 and a signal in synchronism with the write signal/WD and outputs the internal write signal int.WD3 to the second lower level write driver 17 via the inverter circuit 927.

The output node of the inverter circuit 927 is connected to the input node (input node 501 shown in FIG. 6) of the lower level write driver 17.

The NAND circuit 912 is supplied with the head designating signal from the NAND circuit 904 inputted via the inverter circuit 920 and a signal in synchronism with and inverting the write signal/WD and outputs the internal write signal int./WD3 to the second lower level write driver 17 via the inverter circuit 928.

The output node of the inverter circuit 928 is connected to the input node (input node 502 shown in FIG. 6) of the lower level write driver 17.

Numeral 41 is an input buffer circuit for write signal for outputting a signal in synchronism with the write signal/WD and a signal in synchronism therewith and inverted to the write data forming circuit 39 by receiving a write signal/WD inputted to a data input terminal 40.

As shown in FIG. 7, the input buffer circuit 41 is constituted by contiguous two stages of inverter circuits 1001 and 1002 and a flip flop circuit 1003 of T type.

The flip flop circuit 1003 is provided with a clock input terminal CK, a data input terminal D, an output terminal Q, an inverted output terminal/Q and a control terminal. The clock input terminal CK is connected to the output node of the inverter circuit 1002 and receives the write signal/WD. The data input terminal D and the inverted output terminal/Q are connected to each other. A signal in synchronism with the write signal/WD is outputted from the output terminal Q to the write data forming circuit 39. A signal in synchronism with the write signal/WD and inverted is outputted from the inverted output terminal/Q to the write data forming circuit 39.

The power source potential detect signal is inputted from the power source potential detect circuit 27 to the control terminal. When the power source potential detect signal signifies "power source potential Vcc at predetermined potential or higher", the flip flop circuit 1003 performs normal operation. When the power source potential detect signal signifies "power source potential Vcc less than predetermined potential", the flip flop circuit 1003 is set to an initial state and according to the example, regardless of the write signal/WD inputted to the clock input terminal CK, "L" level is outputted to the output terminal Q and "H" level is outputted to the inverted output terminal/Q.

Next, an explanation will be given of the operation of the semiconductor integrated circuit device for reading and writing constituted as described above as follows.

The writing operation and the reading operation in respect of the first and the second high capacity magnetic heads differ only by the surface or the rear face of a high capacity record medium and are substantially the same and therefore, mention will be given as follows only in respect of the first high capacity magnetic head. Further, the writing operation and the reading operation in respect of the first and the second lower level magnetic heads differ only by the surface and the rear face of a lower level record medium and are substantially the same and accordingly, mention will be given as follows with respect to the first lower level magnetic head.

Firstly, an explanation will be given of the case where data recorded on the surface of a high capacity record medium is read by the first high capacity magnetic head.

In this case, respective signals inputted to the semiconductor integrated circuit device 100 are as follows.

The chip select signal/CS inputted to the chip select signal input terminal 28 is a signal signifying that a chip is selected and a signal at "L" level in this example.

The read/write signal R/W inputted to the read/write signal input terminal 22 is a signal signifying reading and a signal at "H" level in this example.

The head select signals HS0 and HS1 inputted to the head select signal input terminals 23 and 24 are signals signifying the selection of the first high capacity magnetic head and in this example, HS0 is a signal at "L" level and HS1 is a signal at "L" level.

The gain switch signal/HG inputted to the input terminal 38 for gain switch signal is a signal signifying the selection of the high capacity read amplifier and is a signal at "H" level in this example.

As a result of receiving above-described signals, the respective constituent elements perform the following operation or are brought into the following states.

The write current supply circuit 25 brings the high capacity write drivers 14 and 15 and the lower level write drivers 16 and 17 into an unselected state by the read/write signal R/W signifying "read" inputted via the input buffer circuit 32 for read/write signal. That is, the common connection points 405 of the high capacity write drivers 14 and 15 shown in FIG. 5 and the common connection points 505 of the lower level write drivers 16 and 17 shown in FIG. 6 are brought into an electrically floating state.

Further, the write data forming circuit 39 outputs signals signifying "no write data" in respect of all the internal write signals int.WD0, int./WD0, int.WD1, int./WD1, int.WD2, int./WD2, int.WD3 and int./WD3, or signals at "L" level in this example, to the high capacity write drivers 14 and 15 and the lower level write drivers 16 and 17 by the read/write signal R/W signifying "read" inputted via the input buffer circuit 32 for read/write signal.

That is, signals at "L" level are inputted to the input nodes 401 and 402 of the high capacity write drivers 14 and 15 shown in FIG. 5 and accordingly, all of the transistors 406 through 409 are brought into a nonconductive state by which the pairs 6 and 7 of high capacity input/output terminals, the power source potential node 19 and the common connection points 405 are brought into an electrically unconnected state. Further, signals at "L" level are inputted to the input nodes 501 and 502 of the lower level write drivers 16 and 17 shown in FIG. 6 and therefore, all of the transistors 506 and 507 are brought into a nonconductive state by which the pairs 8 and 9 of lower level input/output terminals and the common connection points 505 are brought into an electrically unconnected state.

The head selecting circuit 34 outputs the head selection decode signal of 4 bits signifying the selection of the first high capacity magnetic head, or "L, H, H, H" in this example by receiving the head select signals HS0 and HS1.

The selecting circuit 31 for read amplifier outputs the head designating signals SL0 through SL3 signifying the selection of the first high capacity magnetic head, or the head designating signal SL0 at "L" level and the head designating signals SL1 through SL3 at "H" level based on the head selection decode signal from the head selecting circuit 34 by receiving the chip select signal/CS signifying "selection" and the read/write signal R/W signifying "read".

Receiving the head designating signal SL0 at "L" level from the selecting circuit 31 for read amplifier, the first high capacity read amplifier 10 is brought into an activated state. That is, according to the first high capacity read amplifier 10 shown in FIG. 3, the constant current source 214 performs operation of drawing constant current from the common potential point 207 to the ground potential node, current flows in the transistors 206 and 210 in accordance with the potential difference between the pair of input nodes 202 and 203 connected to the first pair of high capacity input/output terminals 6 and the potential in accordance with the potential difference between the pair of input nodes is outputted to the pair of output nodes 204 and 205.

The second high capacity read amplifier 11 and the first and the second lower level read amplifiers 12 and 13 are brought into a deactivated state by respectively receiving the head designating signals SL1 through SL3 at "H" level from the selecting circuit 31 for read amplifier. That is, according to the second high capacity read amplifier 11 shown in FIG. 3, the constant current source 214 brings the common potential point 207 into an electrically floating state, current does not flow in the transistors 206 and 210 regardless of the potential difference between the pair of input nodes 202 and 203 connected to the second pair of high capacity input/output terminals 7 and the potential of the pair of output nodes 204 and 205 becomes the internal voltage Vc applied to the internal power source potential nodes 201. Further, according to the first and the second lower level read amplifiers 12 and 13 shown in FIG. 4, the constant current source 319 brings the common potential point 309 into an electrically floating state, current does not flow in the transistors 308 and 311 regardless of the potential difference between the pairs of input nodes 302 and 303 connected to the first and the second pairs of lower level input/output terminals 8 and 9 and the potential of the pair of output nodes 304 and 305 becomes the internal voltage Vc inputted to the internal power source potential nodes 301.

In conclusion, the first high capacity read amplifier 10 is brought into an activated state and the second high capacity read amplifier 11, the first and the second lower level read amplifiers 12 and 13, the first and the second write drivers 14 and 15 and the first and the second lower level write drivers are brought into a deactivated state.

Accordingly, by reading data recorded on the surface of the high capacity record medium, the potential difference generated across the both ends of the high capacity write/read coil 1 in the first high capacity magnetic head, is generated at the first pair of high capacity input/output terminals 6.

The potential difference generated at the first pair of high capacity input/output terminals 6, is inputted to the pair of input nodes 202 and 203 of the first high capacity read amplifier 10. The first high capacity read amplifier 10 outputs output voltage (potential difference) to the pair of output nodes 204 and 205 based on the potential difference generated at the pair of input nodes 202 and 203.

In this case, data recorded on the high capacity record medium is recorded with high line density and therefore, the potential difference inputted to the pair of input nodes 202 and 203 of the first high capacity read amplifier 10 is small and liable to receive influence of noise. However, according to the transistors 206, 208, 210 and 211 constituting the first high capacity read amplifier 10, the area of the emitter is reduced by forming the emitter in a comb-like shape and therefore, the output generated at the pair of output nodes 202 and 203 is provided with an excellent S/N ratio. As a result, the output from the pair of output nodes 204 and 205 of the first high capacity read amplifier 10 becomes accurate and honest based on the potential difference generated at the both ends of the high capacity write/read coil 1.

The output (potential difference) generated at the pair of output nodes 204 and 205 of the first high capacity read amplifier 10, is inputted to the pair of input nodes of the amplifying circuit 35.

Upon receiving the gain switch signal/HG at "H" level, the amplifying circuit 35 amplifies the output from the first high capacity read amplifier 10 by the second gain and outputs it to the data output terminals 36 and 37.

In this way, data recorded on the surface of a high capacity record medium is read by the first high capacity write/read coil 1 and the read data is amplified by the first high capacity read amplifier 10 and the amplifying circuit 35 and outputted to the data output terminals 36 and 37.

Next, an explanation will be given of the case where data recorded on the surface of a lower level record medium is read by the first lower level magnetic head.

In this case, the respective signals inputted to the semiconductor integrated circuit device 100 are as follows. The chip select signal/CS inputted to the chip select signal input terminal 18 is a signal signifying that a chip is selected, or a signal at "L" level in this example.

The read/write signal R/W inputted to the read/write signal input terminal 22 signifies reading operation, or a signal at "H" level in this example.

The head select signals HS0 and HS1 inputted to the head select signal input terminals 23 and 24 signify the selection of the first lower level magnetic head. In this example, HS0 is a signal at "H" level and HS1 is a signal at "L" level.

The gain switch signal/HG inputted to the gain switch signal input terminal 38 signifies the selection of the lower level read amplifier, or a signal at "L" level in this example.

As a result of receiving the above-described signals, the respective constituent elements perform the following operation or are brought into the following states.

The write current supply circuit 25 brings the high capacity write drivers 14 and 15 and the lower level write drivers 16 and 17 into an unselected state by the read/write signal R/W signifying "read" inputted via the input buffer circuit 32 for read/write signal.

Further, the write data forming circuit 39 outputs signals signifying "no write data" in respect of all the internal write signals int.WD0, int./WD0, int.WD1, int./WD1, int.WD2, int./WD2, int.WD3 and int./WD3, or signals at "L" level in this example to the high capacity write drivers 14 and 15 and the lower level write drivers 16 and 17 by the read/write signal R/W signifying "read" inputted via the input buffer circuit 32 for read/write signal.

The head selecting circuit 34 outputs the head selection decode signal of 4 bits signifying the selection of the first lower level magnetic head, or "H, H, L, H" in this example by receiving the head select signals HS0 and HS1.

The selecting circuit 31 for read amplifier outputs the head designating signals SL0 through SL3 signifying the selection of the first lower level magnetic head, or the designating signal SL2 at "L" level and the head designating signals SL0, SL1 and SL3 at "H" level in this example based on the head selection decode signal from the head selecting circuit 34 by receiving the chip select signal/CS signifying "selection" and the read/write signal R/W signifying "read".

Upon receiving the head designating signal SL2 at "L" level from the selecting circuit 31 for read amplifier, the first lower level read amplifier 12 is brought into an activated state.

The first and the second high capacity read amplifiers 10 and 11 and the second lower level read amplifiers 13 are brought into a deactivated state by respectively receiving the head designating signals SL0, SL1 and SL3 at "H" level from the selecting circuit 31 for read amplifier.

In conclusion, the first lower level read amplifier 12 is brought into an activated state and the first and the second high capacity read amplifiers 10 and 11, the second lower level read amplifier 13, the first and the second write drivers 14 and 15 and the first and the second lower level write drivers are brought into a deactivated state.

Accordingly, by reading data recorded on the surface of a lower level record medium, the potential difference generated across both ends of the lower level write/read coil 3 in the first lower level magnetic head, is generated at the first pair of input/output terminals 8. In this case, the line density of data recorded on the lower level record medium is not so high (about ⅕₀ as much as the line density of a high capacity record medium) and therefore, the potential difference generated across the both ends of the lower level write/read coil 3 is provided with a comparatively large value.

The potential difference generated at the first pair of lower level input/output terminals 8, is inputted to the pair of input nodes 302 and 303 of the first lower level read amplifier 12. The first lower level read amplifier 12 outputs output voltage (potential difference) to the pair of output nodes 304 and 305 based on the potential difference generated at the pair of input nodes 302 and 303.

The output (potential difference) generated at the pair of output nodes 304 and 305 of the first lower level read amplifier 12, is inputted to the pair of input nodes of the amplifying circuit 35.

Upon receiving the gain switch signal/HG at "L" level, the amplifying circuit 35 amplifies the output from the first lower level read amplifier 12 by the first gain and outputs it to the data output terminals 36 and 37.

In this way, data recorded on the surface of a lower level record medium is read by the first lower level write/read coil 3, the read data is amplified by the first lower level read amplifier 12 and the amplifying circuit 35 and is outputted to the data output terminals 36 and 37.

Next, an explanation will be given of the case where data is recorded (written) to the surface of a high capacity record medium by the first high capacity magnetic head.

In this case, various signals inputted to the semiconductor integrated circuit device 100 are as follows.

The chip select signal/CS inputted to the input terminal 28 for chip select signal is a signal signifying that a chip is selected, or a signal at "L" level in this example.

The read/write signal R/W inputted to the input terminal 22 for read/write signal is a signal signifying writing operation, or a signal at "L" level in this example.

The head select signals HS0 and HS1 inputted to the input terminals 23 and 24 for head select signal are signals signifying the selection of the first high capacity magnetic head or a signal at "L" level for HS0 and a signal at "L" level for HS1 in this example.

The write current control signal WC inputted to the input terminal 26 for write current control signal is a signal for designating the lowest current value, for example, about 10 mA when the writing operation is performed on the inner peripheral side of the high capacity record medium and a current value a little higher than that in the case of the inner peripheral side, for example, about 11 through 12 mA when the writing operation is performed on the outer peripheral side of the high capacity record medium.

As a result of receiving the above-described signals, the respective constituent elements perform the following operation or are brought into following states.

The selecting circuit 31 for read amplifier outputs a signal signifying that all of the head designating signals SL0 through SL3 are "not designated", or a signal at "H" level in this example to the first and the second high capacity read amplifiers 10 and 11 and the first and the second lower level read amplifiers 12 and 13 by receiving the read/write signal R/W signifying "write" inputted via the input buffer circuit 32 for read/write signal. This operation means that the first and the second high capacity read amplifiers 10 and 11 and the first and the second lower level read amplifiers 12 and 13 are brought into an unselected state.

Figure 14:
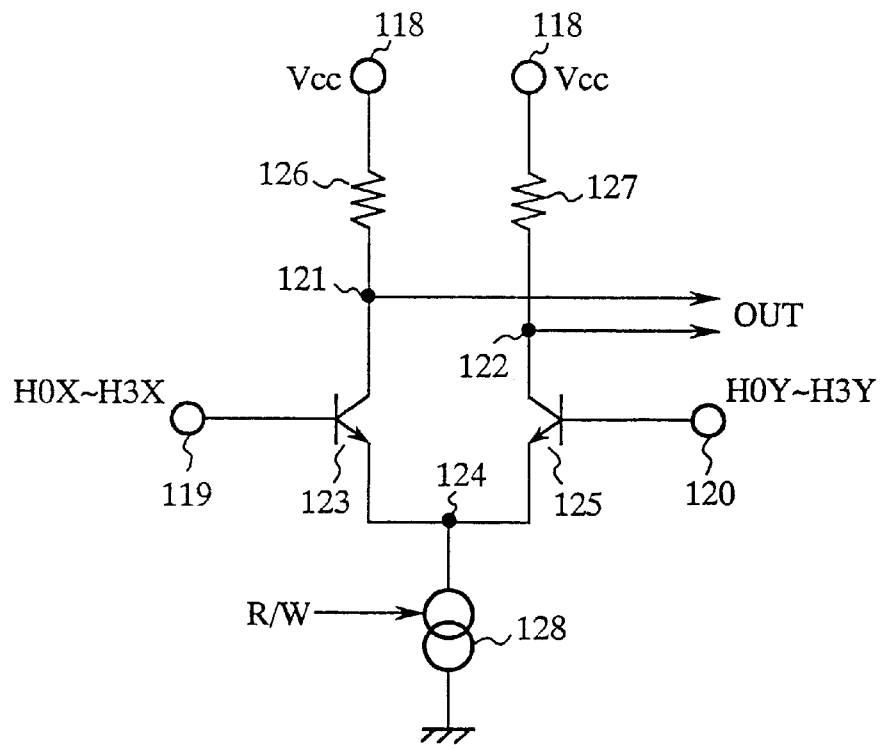
FIG. 14 is a circuit diagram showing a conventional read amplifier.
Figure 15:
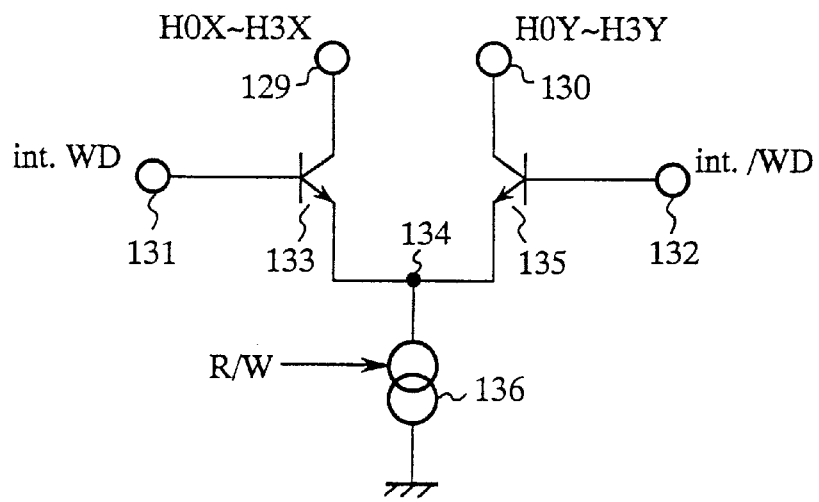
FIG. 15 is a circuit diagram showing a conventional write driver.

The common connection points 207 of the high capacity read amplifiers 10 and 11 shown in FIG. 3 and the common connection points 309 of the lower level read amplifiers 12 and 13 shown in FIG. 4 are brought into an electrically floating state. As a result, the potential generated at the pairs of output nodes 204 and 205 of the high capacity read amplifiers 10 and 11 shown in FIG. 3 becomes the internal voltage Vc applied on the internal power source potential nodes 201 regardless of the potential generated at the pairs of input nodes 202 and 203. Further, the potential generated at the pairs of output nodes 304 and 305 of the lower level read amplifiers 12 and 13 shown in FIG. 14 becomes the internal voltage Vc applied on the internal power source potential nodes 301 regardless of the potential generated at the pairs of input nodes 302 and 303.

The write current supply circuit 25 brings the high capacity write drivers 14 and 15 and the lower level write drivers 16 and 17 into an activated state by receiving the read/write signal R/W signifying "write" inputted via the input buffer circuit 32 for read/write signal. That is, the write current supply circuit 25 draws current from the common connection point 405 of the high capacity write driver 14 shown in FIG. 5 by a current value designated by the write current control signal WC (for example, about 10 mA when the writing operation is performed on the inner peripheral side and about 11 through 12 mA when the writing operation is performed on the outer peripheral side). At this moment, the write current supply circuit 25 operates to draw current having a current value designated by the write current control signal WC also from the common connection point 405 of the second high capacity write driver 15 shown in FIG. 5 and the common connection points 505 of the first and the second lower level write drivers 16 and 17 shown in FIG. 6.

The head selecting circuit 34 outputs the head selection decode signal of 4 bits signifying the selection of the first high capacity magnetic head, or "L, H, H, H" in this example by receiving the head select signals HS0 and HS1.

Upon receiving the read/write signal R/W signifying "write" inputted via the input buffer circuit 32 for read/write signal, the write data forming circuit 39 outputs the internal write signals int.WD0 and int./WD0 as signals in accordance with the write signal/WD from the data input terminal 40 inputted via the input buffer circuit 41 for write signal, that is, as signals of one at "H" level and other at "L" level, to the first high capacity write driver 14, based on the head selection decode signal from the head selecting circuit 34, and outputs the internal write signals int.WD1, int.WD/1, int.WD2, int./WD2, int.WD3 and int./WD3 as signals signifying "no write data", or signals at "L" level in this example, to the second high capacity write driver 15 and the lower level write drivers 16 and 17.

Upon receiving the internal write signals int.WD0 and int./WD0 based on the write signal/WD from the write data forming circuit 39, the first high capacity write driver 14 flows the write current to the first high capacity write/read coil 1 based on the write signal/WD. That is, one of the input nodes 401 and 402 of the first high capacity write driver 14 shown in FIG. 5, is set to "H" level and the other is set to "L" level based on the internal write signals int.WD0 and int./WD0. The transistors 406 and 409, the gate electrodes of which are connected to the input node 401 are brought into one of a conductive state and a nonconductive state and transistors 407 and 408, gate electrodes of which are connected to the input node 402, are brought into the other of the conductive state and the nonconductive state.

As a result, the write current supply circuit 25 draws current having a current value designated by the write current control signal WC from the power source potential node 19 via the transistor 409, the output node 404, the first high capacity input/output terminal 6Y, the first high capacity write/read coil 1, the first high capacity input/output terminal 6X, the output node 403, the transistor 406 and the common connection point 405, or via the transistor 408, the output node 403, the first high capacity input/output terminal 6X, the first high capacity write/read coil 1, the first high capacity input/output terminal 6Y, the output node 404, the transistor 407 and the common connection point 405.

In this way, data based on the write signal/WD is recorded on the high capacity record medium by flowing current to the first high capacity write/read coil 1.

Meanwhile, the input nodes 401 and 402 of the second high capacity write driver 15 shown in FIG. 5 are inputted with a signal at "L" level and therefore, all of the transistors 406 through 409 are brought into a nonconductive state by which the pair of high capacity input/output terminals 7, the power source potential node 19 and the common connection point 405 are brought into an electrically unconnected state. Further, signals at "L" level are inputted to the input nodes 501 and 502 of the lower level write drivers 16 and 17 shown in FIG. 6 and accordingly, all the transistors 506 and 507 are brought into a nonconductive state by which the pairs of lower level input/output terminals 8 and 9 and the common connection points 505 are brought into an electrically nonconductive state.

Accordingly, no current flows in the second high capacity write/read coil 2 and the first and the second lower level write/read coils 3 and 4.

As described above, when current is flown in the first high capacity write/read coil 1 based on the write signal/WD, although terminal voltages are generated at the first high capacity input/output terminals 6X and 6Y as shown in FIGS. 8D and 8E, current flowing in the first high capacity write/read coil 1 is low, for example, 10 through 12 mA and therefore, an instantaneous voltage difference Vd generated between the first high capacity input/output terminals 6X and 6Y in changing levels of the internal write signal int.WD and the internal write signal int./WD is small. Accordingly, although the voltage difference generated between the first high capacity input/output terminals 6X and 6Y is added as an inverse voltage between the bases and the emitters of the input transistors 206 and 210 of the first high capacity read amplifier 10 where the pair of input nodes 202 and 203 are connected to the first pair of high capacity input/output terminals 6, the voltage difference does not exceed the withstand voltages of the input transistors 206 and 210 and the input transistors 206 and 210 are not destructed.

Incidentally, notation Vb designates a voltage drop caused by the high capacity write/read coil 1 and notation Vcc designates the power source voltage applied on the power source potential node in FIGS. 8A through 8E.

In conclusion, the first high capacity write driver 14 is brought into an activated state, the second high capacity write driver 15, the first and the second lower level write drivers 16 and 17, the first and the second high capacity read amplifiers 10 and 11, and the first and the second lower level read amplifiers 12 and 13 are brought into a deactivated state.

Accordingly, the write signal/WD inputted to the data input terminal 40 is converted into the internal write signals int.WD0 and int./WD0 based on the write signal/WD at the write data forming circuit 39 and is inputted to the first high capacity write driver 14.

The first high capacity write driver 14 inputted with the internal write signals int.WD0 and int./WD0, flows current to the high capacity write/read coil 1 in the first high capacity magnetic head based on the internal write signals int.WD0 and int./WD0 by which data based on the write signal/WD is recorded on the surface of the high capacity record medium.

In this case, although the voltage difference is generated between the first high capacity input/output terminals 6X and 6Y by flowing current in the high capacity write/read coil 1, the value is small. Accordingly, no adverse influence is effected on the first high capacity read amplifier 10 where the pair of input nodes are connected to the first high capacity input/output terminals 6X and 6Y by the voltage difference generated between the first high capacity input/output terminals 6X and 6Y.

Next, an explanation will be given of the case where data is recorded (written) in the surface of the lower level record medium by the first lower level magnetic head.

In this case, various signals inputted to the semiconductor integrated circuit device 100 are as follows.

The chip select signal/CS inputted to the input terminal 28 for chip select signal is a signal signifying that a chip is selected, or a signal at "L" level in this example.

The read/write signal R/W inputted to the read/write signal input terminal 22 is a signal signifying writing operation, or a signal at "L" level in this example.

The head select signals HS0 and HS1 inputted to the head select signal input terminals 23 and 24 are signals signifying the selection of the first lower level magnetic head and a signal at "H" level for HS0 and a signal at "L" level for HS1 in this example.

The write current control signal WC inputted to the input terminal 26 for write current control signal is a signal having the largest value (value about 5 through 6 times as large as a value for high capacity record medium), for example, a signal for instructing a current value of about 60 mA.

As a result of receiving the above-described signals the respective constituent elements perform the following operation or are brought into the following states.

The selecting circuit 31 for read amplifier outputs signals signifying "not designated" in respect of all the head designating signals SL0 through SL3, signals at "H" level in this example to the first and the second high capacity read amplifiers 10 and 11 and the first and the second lower level read amplifiers 12 and 13 by receiving the read/write signal R/W signifying "write" inputted via the input buffer circuit 32 for read/write signal. This means that the first and the second high capacity read amplifiers 10 and 11 and the first and the second lower level read amplifiers 12 and 13 are brought into an unselected state.

Upon receiving the read/write signal R/W signifying "write" inputted via the input buffer circuit 32 for read/write signal, the write current supply circuit 25 brings the high capacity write drivers 14 and 15 and the lower level write drivers 16 and 17 into an activated state. That is, the write current supply circuit 25 draws current having a current value designated by the write current control signal WC (for example, about 60 mA) from the common connection point 505 of the first lower level write driver shown in FIG. 6. In this case, the write current supply circuit 25 draws current having a current value designated by the write current control signal WC also from the common connection points 405 of the first and the second high capacity write drivers 14 and 15 shown in FIG. 5 and the common connection point 505 of the second lower level write driver 17 shown in FIG. 6.

The head selecting circuit 34 outputs the head selection decode signal of 4 bits signifying the selection of the first lower level magnetic head, or "H, H, L, H" in this example by receiving the head select signals HS0 and HS1.

Upon receiving the read/write signal R/W signifying "write" inputted via the input buffer circuit 32 for read/write signal, the write data forming circuit 39 outputs based on the head selection decode signal from the head selecting circuit 34 the internal write signals int.WD2 and int./WD2 as signals in accordance with the write signal/WD from the data input terminal 40 inputted via the input buffer circuit 41 for write signal, or one signal at "H" level and other signal at "L" level, to the first lower level write driver 16, and outputs the internal write signals int.WD0, int./WD0, int.WD1, int./WD1, int.WD3 and int./WD3 as signals signifying "no write data", or signals at "L" level in this example, to the first and the second high capacity write drivers 14 and 15 and the second lower level write driver 17.

Upon receiving the internal write signals int.WD2 and int./WD2 based on the write signal/WD from the write data forming circuit 39, the first lower level write driver 16 flows the write current to the first lower level write/read coil 3 based on the write signal/WD. That is, one of the input nodes 501 and 502 of the first lower level write driver 16 shown in FIG. 6 is set to "H" level and the other is set to "L" level based on the internal write signals int.WD2 and int./WD2. The transistor 503, the gate electrode of which is connected to the input node 501, is brought into one of a conductive state and a nonconductive state and the transistor 507, the gate electrode of which is connected to the input node 502, is brought into the other of the conductive state and the nonconductive state.

As a result, the write current supply circuit 25 draws current having a current value designated by the write current control signal WC from the center tap CT of the first lower level write/read coil 3 via the first lower level input/output terminal 8X, the output node 503, the transistor 506 and the common connection point 505, or via the first lower level input/output terminal 8Y, the output node 504, the transistor 507 and the common connection point 505.

By flowing current to the lower level write/read coil 3 in this way, data based on the write signal/WD is recorded to the lower level record medium.

Meanwhile, signals at "L" level are inputted to the input nodes 401 and 402 of the first and the second high capacity write drivers 14 and 15 shown in FIG. 5 and therefore, all the transistors 406 through 409 are brought into a nonconductive state and the pairs of high capacity input/output terminals 6 and 7, the power source potential node 19 and the common connection points 405 are brought into an electrically unconnected state. Further, a signal at "L" level is inputted to the input nodes 501 and 502 of the second lower level write driver 17 shown in FIG. 6 and accordingly, all the transistors 506 and 507 are brought into a nonconductive state and the second pair of lower level input/output terminals 9 and the common connection point 505 are brought into an electrically unconnected state.

Accordingly, no current flows in the first and the second high capacity write/read coils 1 and 2 and the second lower level write/read coil 4.

As described above, when current based on the write signal/WD flows in the first lower level write/read coil 3, terminal voltages as shown in FIGS. 16D and 16E are generated at the first lower level input/output terminals 8X and 8Y as has been explained in the priot art. The voltage difference generated between the first lower level input/output terminals 8X and 8Y is also generated at the pair of input nodes 302 and 303 of the first lower level read amplifier 12 connected to the first lower level input/output terminals 8X and 8Y.

Accordingly, the voltage difference generated between the first lower level input/output terminals 8X and 8Y is applied between the input node 302 and the common connection point 309 or between the input node 303 and the common connection point 309. However, the PN junction between the base and the emitter of the transistor 306 for promoting withstand voltage is interposed between the input node 302 and the base electrode of the input transistor 308 and therefore, the withstand voltage between the input node 302 and the common connection point 309 is substantially promoted by which the transistor 306 and 309 are not destructed. Similarly, the PN junction between the base and the emitter of the transistor 310 for promoting withstand voltage is interposed between the input node 303 and the base electrode of the input transistor 310 and accordingly, the withstand voltage between the input node 303 and the common connection point 309 is substantially promoted by which the transistors 310 and 311 are not destructed.

In conclusion, the first lower level write driver 16 is brought into an activated state and the first and the second high capacity write drivers 14 and 15, the second lower level write driver 17, the first and the second high capacity read amplifiers 10 and 11 and the first and the second lower level read amplifiers 12 and 13 are brought into a deactivated state.

Accordingly, the write signal/WD inputted to the data input terminal 40 is converted into the internal write signals int.WD2 and int./WD2 based on the write signal/WD at the write data forming circuit 39 and is inputted to the first lower level write driver 16.

The first lower level write driver 16 inputted with the internal write signals int.WD2 and int./WD2 flows current to the lower level write/read coil 3 in the first lower level magnetic head based on the internal write signals int.WD2 and int./WD2 by which data based on the write signal/WD is recorded on the surface of the lower level record medium.

At this moment, although the voltage difference is generated between the first lower level input/output terminals 8X and 8Y by flowing current to the lower level write/read coil 3, the PN junctions between the bases and the emitters of the transistors 306 and 310 for promoting withstand voltage are interposed between the input nodes 302 and 303 of the first lower level read amplifier 12 and the base electrodes of the input transistors 308 and 311 and accordingly, the voltage difference generated between the first lower level input/output terminals 8X and 8Y does not destruct the input transistors 308 and 311 of the first lower level read amplifier 12 where the pair of input nodes are connected to the first lower level input/output terminals 8X and 8Y.

The semiconductor integrated circuit devices constituted as described above achieve the following effects:

(1) The high capacity read amplifiers 10 and 11, the lower level read amplifiers 12 and 13, the high capacity write drivers 14 and 15 and the lower level write drivers 16 and 17 can be integrated to the same semiconductor chip.

(2) When data recorded on a high capacity record medium is read by a high capacity record head, the S/N ratio is not deteriorated by the read amplifiers.

(3) When data is written in a lower level record medium, the pairs of input transistors 308 and 311 of the lower level read amplifiers 13 and 14 connected to pairs of lower level input/output terminals 8 and 9 to which the lower level write/read coils 3 and 4 in the lower level magnetic heads are connected, are not destructed by the potential differences generated at the pairs of lower level input/output terminals 8 and 9.

Figure 9:
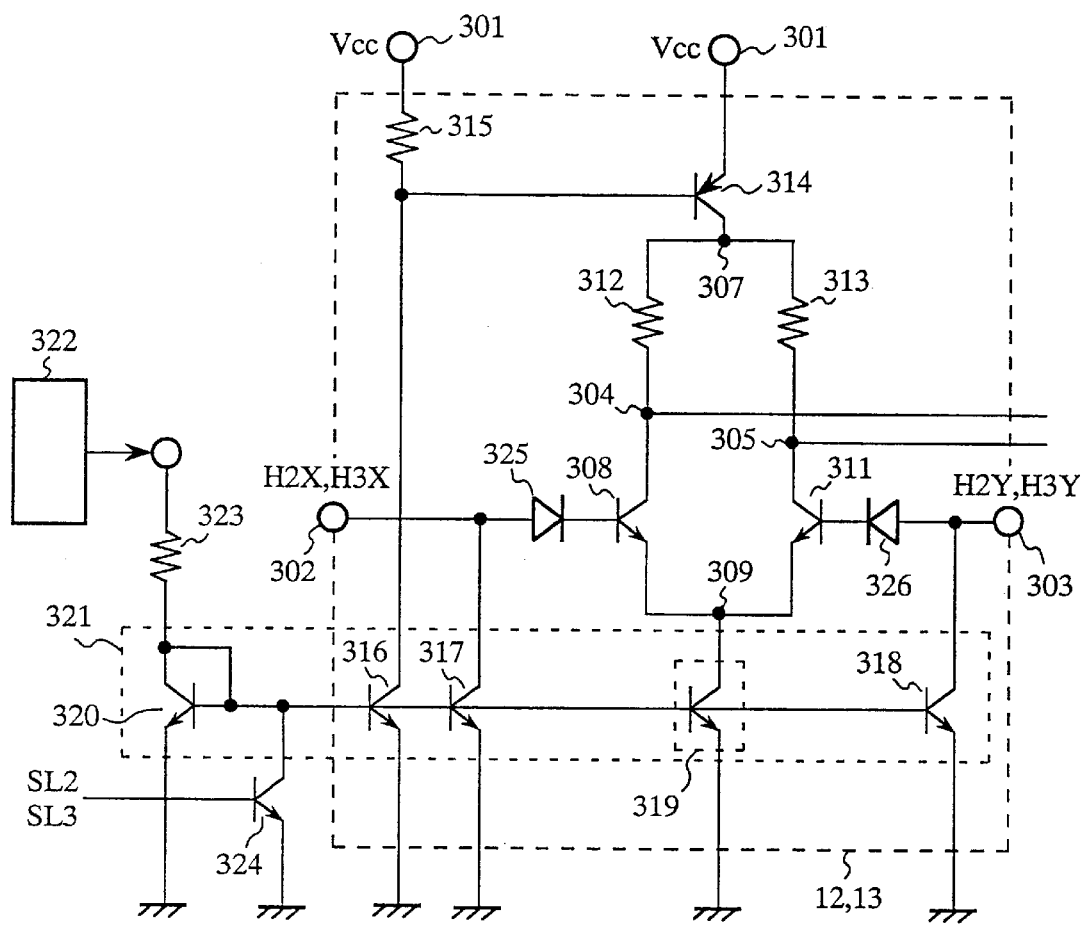
FIG. 9 is a circuit diagram showing other example of the first and the second lower level read amplifiers 12 and 13 according to Embodiment 1.

Incidentally, the lower level read amplifiers 12 and 13 according to Embodiment 1 are not restricted to the ones shown in FIG. 4 but may be ones, for example, shown in FIG. 9.

That is, according to the lower level read amplifiers 12 and 13 shown in FIG. 4, in order to achieve the substantial promotion of the withstand voltage of the input transistors 308 and 311, the PN junctions between the bases and the emitters of the transistors 306 and 310 for promoting withstand voltage are interposed between the input nodes 302 and 303 and the base electrodes of the input transistors 308 and 311. By contrast, according to the lower level read amplifiers 12 and 13 shown in FIG. 9, diode elements 325 and 326 are interposed by connection in the forward direction between the input nodes 302 and 303 and the base electrodes of the input transistors 308 and 311, that is different from the constitution in FIG. 4 while the other points remain the same.

Embodiment 2

Figure 10:
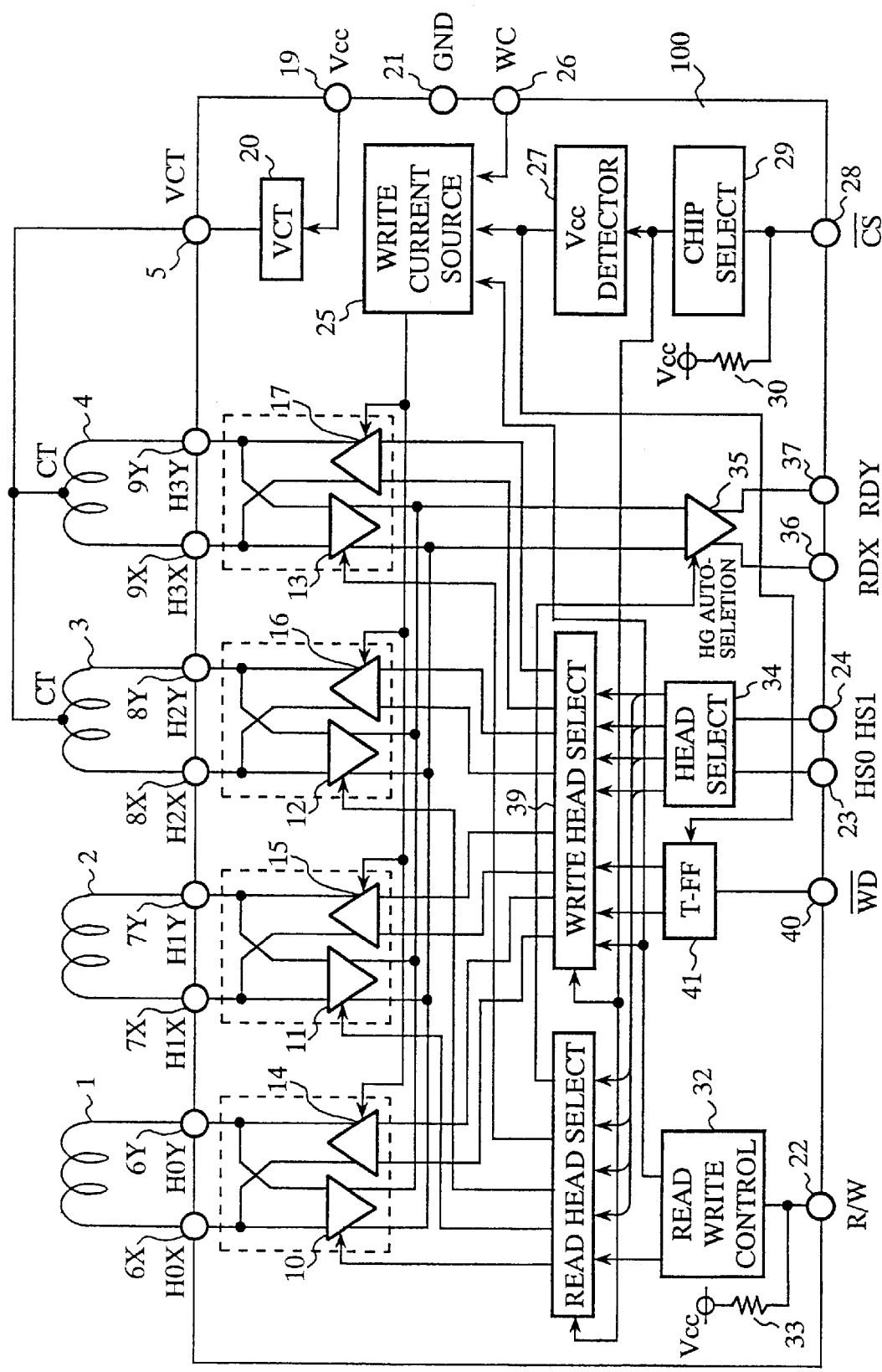
FIG. 10 is a block diagram showing Embodiment 2 of the present invention.
Figure 11:
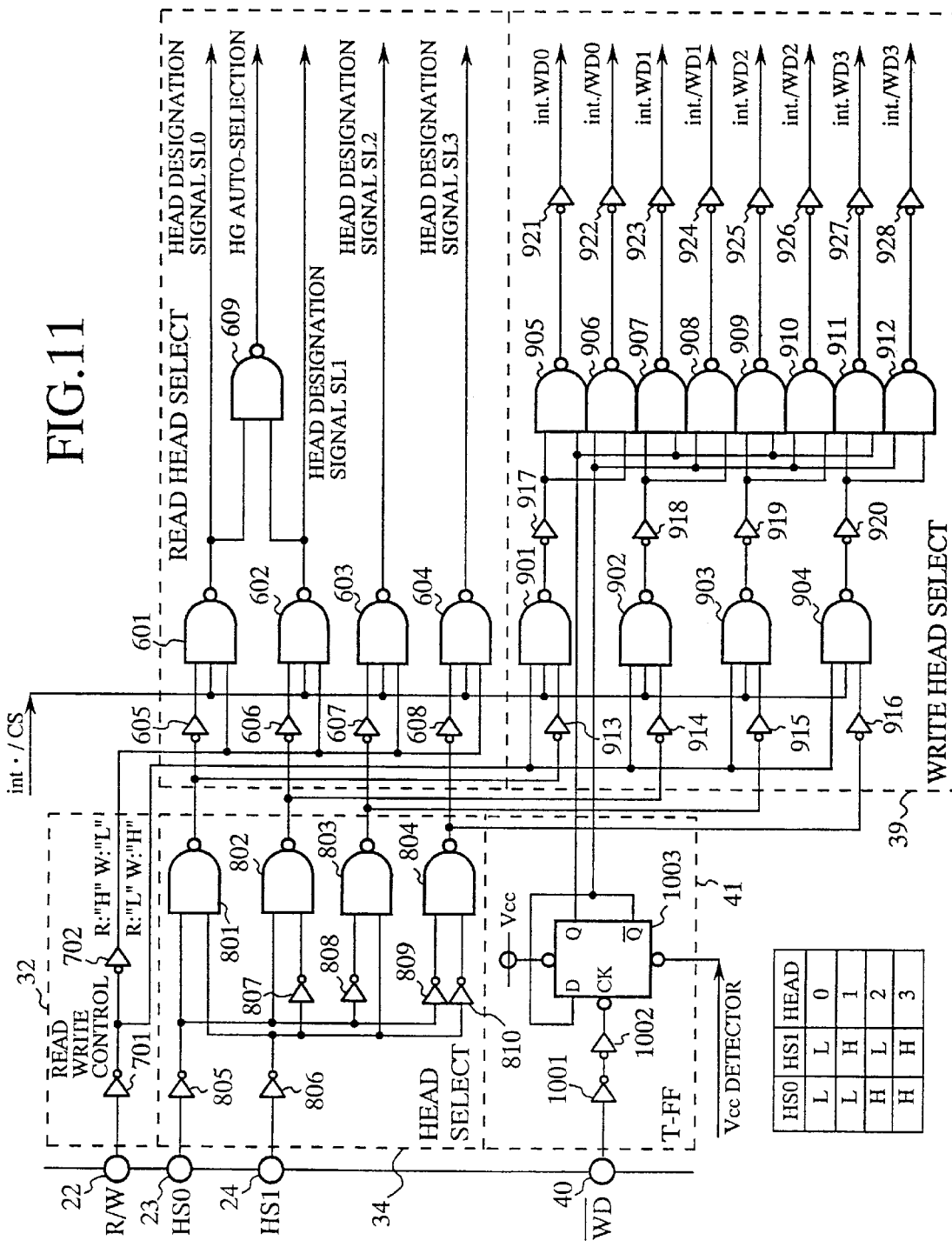
FIG. 11 is a circuit diagram showing a selecting circuit 31 for read amplifier, an input buffer circuit 32 for read/write signal, a head selecting circuit 34, a write data forming circuit 39 and an input buffer circuit 41 for write signal according to Embodiment 2.

FIG. 10 and FIG. 11 show Embodiment 2 of the present invention.

According to Embodiment 1, the gain switch signal/HG for switching the gain of the amplifying circuit 35 is inputted via the input terminal 38 for gain switch signal, whereas, according to a semiconductor integrated circuit device for reading and writing shown in Embodiment 2, the gain switch signal/HG is formed at an internal portion and the input terminal 38 for gain switch signal is dispensed, which is different from Embodiment 1 and other points remain the same.

Accordingly, an explanation will be given of formation of the gain switch signal/HG at an internal portion as follows. Incidentally, in FIG. 10 and FIG. 11, notations the same as the notations attached to the drawings showing Embodiment 1 designate the same or the corresponding portions.

In Embodiment 2, the gain switch signal/HG is formed by the selecting circuit 31 for read amplifier for forming the head designating signals SL0 through SL3.

As shown in FIG. 11, the selecting circuit 31 for read amplifier is constituted by 4 of the 3 inputs NAND circuits 601 through 604 and 4 of the inverter circuits 605 through 608 similar to Embodiment 1 and is further provided with a 2 inputs NAND circuit as a gain switch signal forming mean 609.

The 2 inputs NAND circuit 609 is supplied with the head designating signal SL0 from the NAND circuit 601 and the head designating signal SL1 from the NAND circuit 602 and outputs the gain switch signal/HG.

The gain switch signal/HG becomes a signal at "H" level in this example when a signal signifying that the head designating signal SL0 is "designated", or a signal at "L" level is inputted in this example and when a signal signifying that the head designating signal SL1 is "designated", or a signal at "L" level is inputted in this example, and becomes a signal at "L" level in this example, when a signal signifying that both of the head designating signal SL0 and the head designating signal SL1 are "not designated", or a signal at "H" level is inputted in this example.

In the case of the signal signifying that the head designating signal SL0 is "designated" and the signal signifying that the head designating signal SL1 is "designated", it signifies that "the high capacity read amplifiers are selected" and in the case of the signal signifying that both of the head designating signal SL0 and the head designating signal SL1 are "not designated", it signifies that "the lower level read amplifiers are selected".

Accordingly, when the gain switch signal/HG is a signal at "H" level, it signifies that "the high capacity read amplifiers are selected" and when the gain switch signal/HG is a signal at "L" level, it signifies that "the lower level read amplifiers are selected".

As a result, the gain switch signal/HG becomes a signal the same as that in Embodiment 1.

Even with the semiconductor integrated circuit device for reading and writing constituted as described above, the effects (1) through (3) are achieved similar to Embodiment 1 and further, an effect whereby the input terminal 38 for gain switch signal (lead terminal/HG sshown in FIG. 2) can be dispensed and the lead terminal/HG can be effectively utilized, is achieved.

Embodiment 3

Figure 12:
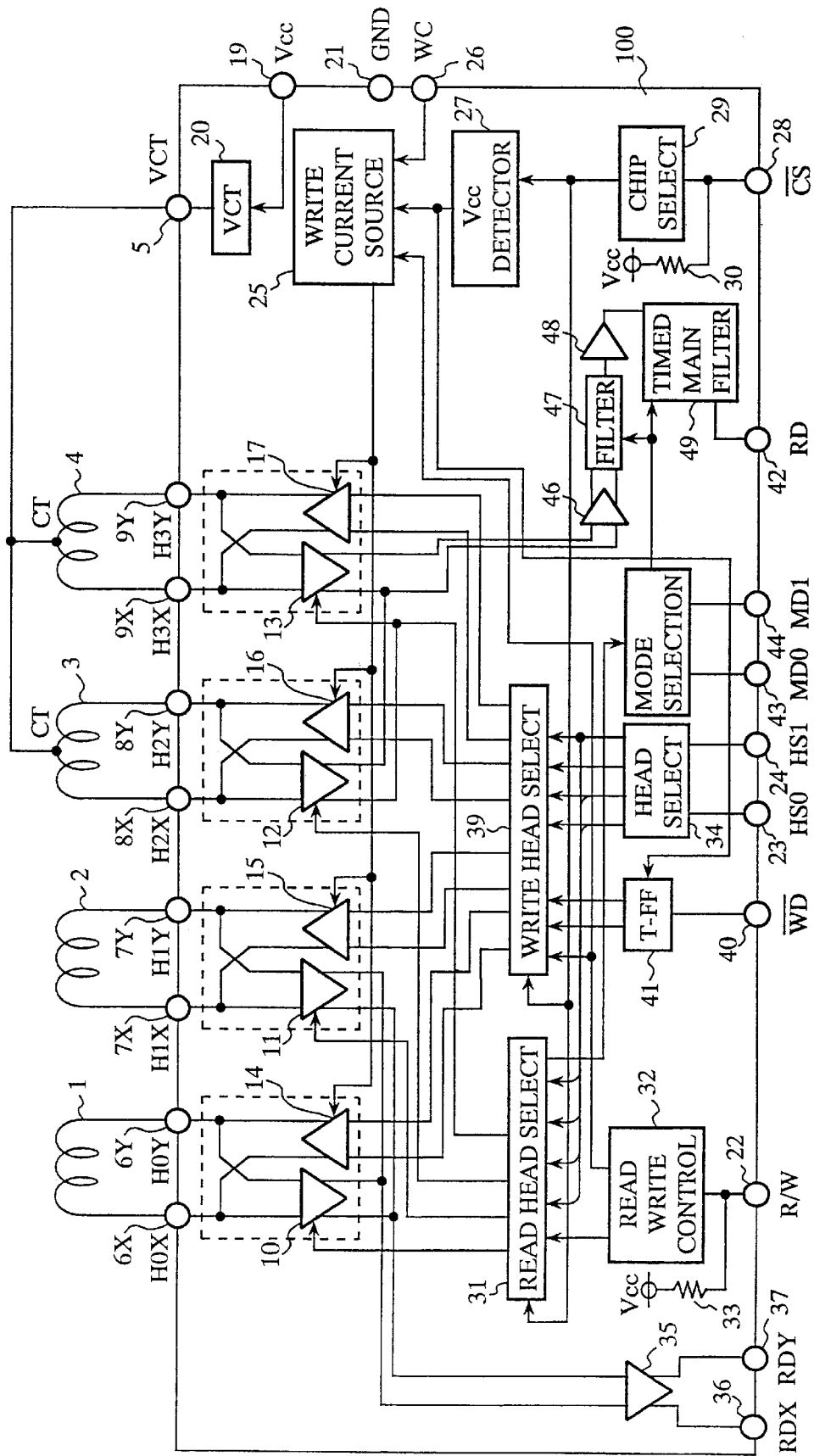
FIG. 12 is a block diagram showing Embodiment 3 of the present invention.
Figure 13:
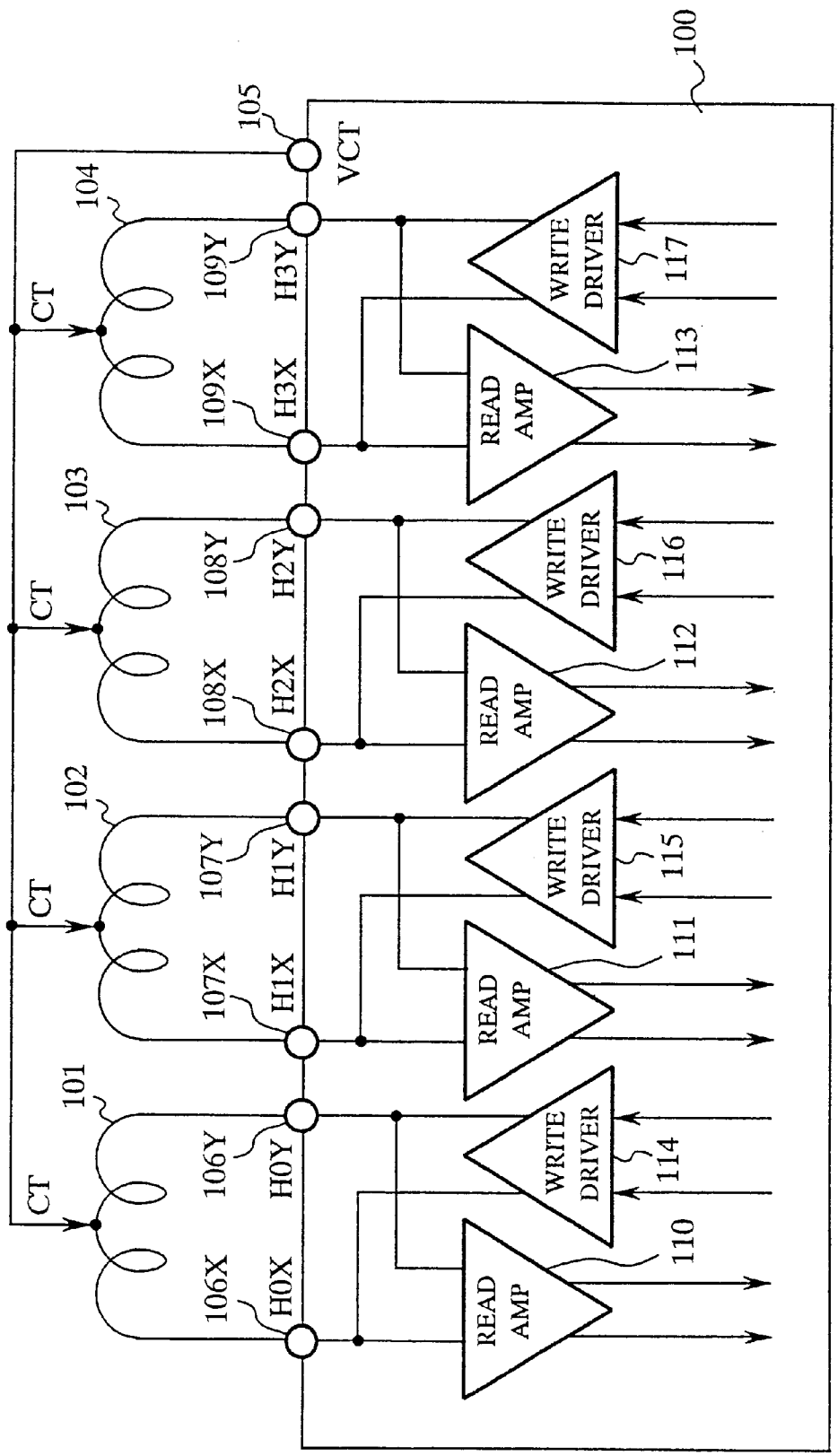
FIG. 13 is a block diagram showing one proposed example of a semiconductor integrated circuit device for reading and writing.

FIG. 12 shows Embodiment 3 of the present invention.

Acording to Embodiment 1, the outputs from the first and the second high capacity read amplifiers 10 and 11 and the first and the second lower level read amplifiers 12 and 13 are amplified by the amplifying circuit 35 and outputted to the data output terminals 36 and 37, whereas, according to a semiconductor integrated circuit device for reading and writing shown in Embodiment 3, although the outputs from the first and the second high capacity read amplifiers 10 and 11 are amplified by the amplifying circuit 35 and outputted to the data output terminals 36 and 37, the outputs from the first and the second lower level read amplifiers 12 and 13 are outputted to a data output terminal 42 via an amplifying circuit 46, a filter 47, a zero cross comparator 48 and an analog to digital converter having a time domain filter 49, which is different from Embodiment 1 and the other points remain the same.

Therefore, an explanation will be given as follows with respect to the differences. Incidentally, in FIG. 12, notations the same as the notations attached to the drawings showing Embodiment 1 designate the same or the corresponding portions.

The amplifying circuit 35 amplifies the outputs from the high capacity read amplifiers 10 and 11 by a predetermined gain and outputs them to the data output terminals 36 and 37. For example, the amplifying circuit 35 is an amplifying circuit constituted by a differential amplifying circuit. A pair of input nodes of the amplifying circuit 35 are connected to the pairs of output nodes of the high capacity read amplifiers 10 and 11 (output nodes 204 and 205 shown in FIG. 3) and the pair of output nodes thereof are connected to the data output terminals 36 and 37.

An activated state or a deactivated state of the mode selecting circuit 45 is controlled by receiving the gain switch signal/HG (a record medium designating signal designating a high capacity record medium or a lower level record medium according to Embodiment 3) from the selecting circuit 31 for read amplifier, and the mode selecting circuit 45 outputs a mode designating signal of 4 bits by receiving mode select signals MD0 and MD1 for designating either one of modes of a lower level record medium, for example, a storage capacity of 1 M (250 kbps), 1 M (300 kbps), 1.6 M or 2 M (effective capacity; 1.44 M) via input terminals 43 and 44 for mode select signal.

When the record medium designating signal from the selecting circuit 31 for read amplifier (using the gain switch signal/HG of FIG. 11 showing the selecting circuit 31 for read amplifier in Embodiment 2, according to Embodiment 3), signifies that "the high capacity record medium is designated", the mode selecting circuit 45 is brought into a deactivated state and outputs a mode designating signal with all of 4 bits at "L" level in this example irrespective of the inputted mode select signals MD0 and MD1.

When the record medium designating signal from the selecting circuit 31 for read amplifier signifies that "a lower level record medium is designated", the mode selecting circuit 45 is brought into an activated state and outputs a mode designating signal with either 1 bit in the 4 bits at "H" level and the remaining 3 bits at "L" level based on the inputted signal mode select signals MD0 and MD1.

The amplifying circuit 46 is an amplifying circuit, for example, constituted by a differential amplifying circuit for amplifying the outputs from the lower level read amplifiers 12 and 13 by a predetermined gain and outputting them to the data output terminal 42. The gain of the amplifying circuit 46 may be about ⅕ times as much as the gain of the amplifying circuit 35. A pair of input nodes of the amplifying circuit 46 are connected to the pairs of output nodes of the lower level read amplifiers 12 and 13 (output nodes 304 and 305 shown in FIG. 4).

The filter 47 is constituted by a band pass filter the frequency band of which is changed based on the mode designating signal from the mode selecting circuit 45 and which passes a predetermined frequency band of an output from the amplifying circuit 46. The filter 47 is provided with a function capable of providing a differential waveform of the output from the amplifying circuit 46.

The filter 47 is brought into a deactivated state by receiving a mode designating signal with all of 4 bits at "L" level from the mode selecting circuit 45 and functions as the band pass filter having the frequency band based on mode designating signal by receiving a mode designating signal with either 1 bit at "H" level. Incidentally, the frequency band of the filter 47 becomes higher, for example, in the order of modes of storage capacities of 1 M (250 kbps), 1 M (300 kbps), 1.6 M and 2 M.

The zero cross comparator 48 is constituted by a comparator for receiving an output from the filter 47 and a reference potential. The zero cross comparator 48 is for detecting the zero cross of the output from the filter 47 and functions as a peak detecting circuit for detecting a peak of the output from the filter 47.

According to the time domain filter 49, a masking time period is changed base on the mode designating signal from the mode selecting circuit 45 and an output from the zero cross comparator 48 is masked during the masking time period and is outputted to the data output terminal 42.

The time domain filter 49 is brought into a deactivated state by receiving a mode designating signal with all of 4 bits at "L" level from the mode selecting circuit 45 and does not output any data to the data output terminal 42. In this example, the time domain filter 49 brings the data output terminal 42 into an electrically floating state, that is, a high impedance state.

By receiving a mode designating signal with either 1 bit at "H" level from the mode selecting circuit 45, the time domain filter 49 functions as a time domain filter having a masking time period based on the mode designating signal. Incidentally, the masking time period of the time domain filter 49 is shortened when the period is shortened in the order of, for example, modes of storage capacities of 1 M (250 kbps), 1 M (300 kbps), 1.6 M and 2 M.

An analog to digital converter for converting the outputs from the first and the second lower level read amplifiers 12 and 13 into digital signals and outputting them to the data output terminal 42 is constituted by the amplifying circuit 46, the filter 47, the zero cross comparator 48 and the time domain filter 49.

According to the semiconductor integrated circuit device for reading and writing constituted as described above, the operation is basically the same as that of the semiconductor integrated circuit device for reading and writing shown in Embodiment 1.

That is, the writing operation in respect of the high capacity record medium by the first and the second high capacity write/read coils 1 and 2 and the writing operation in respect of a lower level record medium by the first and the second lower level write/read coils 3 and 4 are the same as in the both embodiments.

Further, the reading operation from the high capacity record medium by the first and the second high capacity write/read coils 1 and 2 is also the same as in the both embodiments.

The reading operation from a lower level record medium by the first and the second lower level write/read coils 3 and 4 remains the same up to a point of providing the outputs from the first and the second lower level read amplifiers 12 and 13. According to Embodiment 1, the outputs from the first and the second lower level read amplifiers 12 and 13 are amplified by the amplifying circuit 35 and outputted to the data output terminals 36 and 37, whereas, according to Embodiment 3, the outputs are converted into digital signals and outputted to the data output terminal 42 by the analog to digital converter constituted by the amplifying circuit 46, the filter 47, the zero cross comparator 48 and the time domain filter 49, which is different from Embodiment 1.

Also in the semiconductor integrated circuit device for reading and writing constituted as described above, the effects (1) through (3) are achieved similar to Embodiment 1 and further, an effect by which data read from a lower level record medium can be dealt with as digital signals and accordingly, the processing thereafter is facilitated.

Incidentally, although according to Embodiments 1 through 3, as shown in FIG. 2, in respect of the illustration, the lead terminals H0X and H0Y (first pair of high capacity input/output terminals 6), the lead terminals H1X and H1Y (second pair of high capacity input/output terminals 7), the lead terminals H2X and H2Y (first pair of lower level input/output terminals 8) and the lead terminals H3X and H3Y (second pair of lower level input/output terminals 9) are arranged in this order, the present invention is not limited to the order but the lead terminals may be arranged, for example, in the following orders.

(a) An order of the lead terminals H2X and H2Y (first pair of lower level input/output terminals 8), the lead terminals H3X and H3Y (second pair of lower level input/output terminals 9), the lead terminals H0X and H0Y (first pair of high capacity input/output terminals 6) and the lead terminals H1X and H1Y (second pair of high capacity input/output terminals 7).

(b) An order of the lead terminals H0X and H0Y (first pair of high capacity input/output terminals 6), the lead terminals H2X and H2Y (first pair of lower level input/output terminals 8), the lead terminals H1X and H1Y (second pair of high capacity input/output terminals 7) and the lead terminals H3X and H3Y (second pair of lower level input/output terminals 9).

(c) An order of the lead terminals H0X and H0Y (first pair of high capacity input/output terminals 6), the lead terminals H2X and H2Y (first pair of lower level input/output terminals 8), the lead terminals H3X and H3Y (second pair of lower level input/output terminals 9) and the lead terminals H1X and H1Y (second pair of high capacity input/output terminals 7).

(d) An order of the lead terminals H2X and H2Y (first pair of lower level input/output terminals 8), the lead terminals H0X and H0Y (first pair of high capacity input/output terminals 6), the lead terminals H3X and H3Y (second pair of lower level input/output terminals 9) and the lead terminals H1X and H1Y (second pair of high capacity input/output terminals 7).

(e) An order of the lead terminals H2X and H2Y (first pair of lower level input/output terminals 8), the lead terminals H0X and H0Y (first pair of high capacity input/output terminals 6), the lead terminals H1X and H1Y (second pair of high capacity input/output terminals 7) and the lead terminals H3X and H3Y (second pair of lower level input/output terminals 9).

What is claimed is:

1. A semiconductor integrated circuit device for reading and writing comprising:

pairs of lower level input/output terminals to which write/read coils of write/read heads in lower level magnetic heads are connected;

pairs of high capacity input/output terminals to which write/read coils of write/read heads in high capacity magnetic heads are connected;

lower level read amplifiers pairs of input nodes of which are connected to the pairs of lower level input/output terminals;

high capacity read amplifier pairs of input nodes of which are connected to the pairs of high capacity input/output terminals;

lower level write driver pairs output nodes of which are connected to the pairs of lower level input/output terminals;

high capacity write driver pairs output nodes of which are connected to the pairs of high capacity input/output terminals;

wherein each of the lower level write drivers comprises:

a pair of input nodes to which write signals are inputted;

a first transistor a base electrode of which is connected to one input nodes of the pair of input nodes of each of the lower level write drivers and a collector electrode of which is connected to one output node of the pair of output nodes of each of the lower level write drivers; and a second transistor a base electrode of which is connected to the other input node of the pair of input nodes of each of the lower level write drivers, an emitter electrode of which is connected to an emitter electrode of the first transistor and a collector electrode of which is connected to the other output node of the pair of output nodes of each of the lower level write drivers; and wherein each of the high capacity write drivers comprises:

a pair of input nodes to which write signals are inputted;

a third transistor a base electrode of which is connected to one of the pair of input nodes of each of the high capacity write drivers and a collector electrode of which is connected to one of the pair of output nodes of each of the high capacity write drivers;

a fourth transistor a base electrode of which is connected to other of the pair of input nodes of each of the high capacity write drivers, an emitter electrode of which is connected to an emitter electrode of the third transistor and a base electrode of which is connected to other of the pair of input nodes of each of the high capacity write drivers;

a fifth transistor a base electrode of which is connected to the other of the pair of input nodes of each of the high capacity write drivers, an emitter electrode of which is connected to the one of the pair of output nodes of each of the high capacity write drivers and a collector electrode of which is connected to a power source potential node; and a sixth transistor a base electrode of which is connected to the one of the pair of input nodes of each of the high capacity write drivers, an emitter electrode of which is connected to the other of the pair of output nodes of each of the high capacity write drivers and a collector electrode of which is connected to the power source potential node.

2. The semiconductor integrated circuit device for reading and writing according to claim 1, further comprising:

a selector for selecting one of the lower level read amplifier and the high capacity read amplifier by receiving a head select signal and outputting a gain switch signal showing which of the lower level read amplifier and the high capacity read amplifier is selected; and an amplifying circuit for receiving an output from one of the high capacity write drivers and the lower level write drivers selected by the selector, receiving the gain switch signal from the selector, amplifying the output from one of the lower level read amplifiers which the gain switch signal selects by a first gain, outputting the output as read signals to data output terminals, amplifying the output from one of the high capacity read amplifiers which the gain switch signal selects by a second gain larger than the first gain and outputting the output as read signals to the data output terminals.

3. The semiconductor integrated circuit device for reading and writing according to claim 1, further comprising:

a digital signal converting circuit for receiving an output from one of the lower level amplifiers, converting the output into a digital signal having a binary value based on the received output and outputting the output as read signals to a first one of data output terminals; and an amplifying circuit for receiving an output from one of the high capacity read amplifiers, amplifying the received output by a predetermined gain and outputting the amplified output as read signals to a second one of the data output terminals.

4. The semiconductor integrated circuit device for reading and writing according to claim 1:

wherein each of the lower level read amplifiers comprises:

a seventh transistor a base electrode of which is connected to one of the pair of input nodes of the each of the lower level read amplifiers via a diode element and a collector electrode of which is connected to one of the pair of output nodes of the each of the lower level read amplifiers; and an eighth transistor a base electrode of which is connected to other of the pair of input nodes of the each of the lower level read amplifiers via a diode element, an emitter electrode of which is connected to an emitter electrode of the seventh transistor and a collector electrode of which is connected to other of the pair of output nodes of the each of the lower level read amplifiers; and wherein each of the high capacity read amplifiers comprises:

a ninth transistor a base electrode of which is connected to one of the pair of input nodes of the each of the high capacity read amplifiers and a collector electrode of which is connected to one of the pair of output nodes of the each of the high capacity read amplifiers; and a tenth transistor a base electrode of which is connected to other of the pair of input nodes of the each of the high capacity read amplifiers, an emitter electrode of which is connected to an emitter electrode of the ninth transistor and a collector electrode of which is connected to other of the pair of output nodes of the each of the high capacity read amplifiers.

5. The semiconductor integrated circuit device for reading and writing according to claim 1:

wherein each of the write/read coils of the write/read heads in the lower level magnetic heads connected to the pairs of lower level input/output terminals is a write/read coil of a three terminals type; and wherein each of the write/read coils of the write/read heads in the high capacity magnetic heads connected to the pairs of high capacity input/output terminals is a write/read coil of a two terminals type.

6. The semiconductor integrated circuit device for reading and writing according to claim 5, further comprising:

a center tap voltage output terminal for applying a center tap voltage to center taps of the write/read coils of the write/read heads in the lower level magnetic heads.

7. A semiconductor integrated circuit device for reading and writing comprising:

a first pair of lower level input/output terminals to which a write/read coil of a write/read head in a first lower level magnetic head is connected;

a second pair of lower level input/output terminals to which a write/read coil of a write/read head in a second lower level magnetic head is connected;

a first pair of high capacity input/output terminals to which a write/read coil of a write/read head in a first high capacity magnetic head is connected;

a second pair of high capacity input/output terminals to which a write/read coil of a write/read head in a second high capacity magnetic head is connected;

a first lower level read amplifier a pair of input nodes of which are connected to the first pair of lower level input/output terminals;

a second lower level read amplifier a pair of input nodes of which are connected to the second pair of lower level input/output terminals;

a first high capacity read amplifier a pair of input nodes of which are connected to the first pair of high capacity input/output terminals;

a second high capacity read amplifier a pair of input nodes of which are connected to the second pair of high capacity input/output terminals;

a first lower level write driver a pair of output nodes of which are connected to the first pair of lower level input/output terminals;

a second lower level write driver a pair of output nodes of which are connected to the second pair of lower level input/output terminals;

a first high capacity write driver a pair of output nodes of which are connected to the first pair of high capacity input/output terminals;

a second high capacity write driver a pair of output nodes of which are connected to the second pair of high capacity input/output terminals;

a selector for receiving a head select signal, selecting either one of the first and the second lower level read amplifiers and the first and the second high capacity read amplifiers and outputting a gain switch signal designating which one of the lower level read amplifier and the high capacity read amplifier is selected; and an amplifying circuit for receiving an output from the read amplifier selected by the selector, receiving the gain switch signal from the selector, amplifying the output from one of the lower level read amplifiers which the gain switch signal selects by a first gain and outputting the amplified output as read signals to data output terminals, amplifying the output from one of the high capacity read amplifiers which the gain switch signal selects by a second gain larger than the first gain and outputting the amplified output to the data output terminals as read signals.

8. The semiconductor integrated circuit device for reading and writing according to claim 7:

wherein each of the first and the second lower level write drivers comprises:

a pair of input nodes to which the write signals are inputted;

a first transistor a base electrode of which is connected to one of the pair of input nodes of the each of the first and the second lower level write drivers and a collector electrode of which is connected to one of the pair of output nodes of the each of the first and the second lower level write drivers; and a second transistor a base electrode of which is connected to other of the pair of input nodes of the each of the first and the second lower level write drivers, an emitter electrode of which is connected to an emitter electrode of the first transistor and a collector electrode of which is connected to other of the pair of output nodes of the each of the first and the second lower level write drivers; and wherein each of the first and the second high capacity write drivers comprises:

a pair of input nodes to which the write signals are inputted;

a third transistor a base electrode of which is connected to one of the pair of input nodes of the each of the first and the second high capacity write drivers and a collector electrode of which is connected to one of the pair of output nodes of the each of the first and the second high capacity write drivers;

a fourth transistor a base electrode of which is connected to other of the pair of input nodes of the each of the first and the second high capacity write drivers, an emitter electrode of which is connected to an emitter electrode of the third transistor and a collector electrode of which is connected to other of the pair of output nodes of the each of the first and the second high capacity write drivers;

a fifth transistor a base electrode of which is connected to the other of the pair of input nodes of the each of the first and the second high capacity write drivers, an emitter electrode of which is connected to the one of the pair of output nodes of the each of the first and the second high capacity write drivers and a collector electrode of which is connected to a power source potential node; and a sixth transistor a base electrode of which is connected to the one of the pair of input nodes of the each of the first and the second high capacity write drivers, an emitter electrode of which is connected to the other of the pair of output nodes of the each of the first and the second lower level write drivers and a collector electrode of which is connected to the power source potential node.

9. The semiconductor integrated circuit device for reading and writing according to claim 7:

wherein each of the first and the second lower level read amplifiers comprises:

a seventh transistor a base electrode of which is connected to one of the pair of input nodes of the each of the first and the second lower level read amplifiers via a diode element and a collector electrode of which is connected to one of the pair of output nodes of the each of the first and the second lower level read amplifiers; and an eighth transistor a base electrode of which is connected to other of the pair of input nodes of the each of the first and the second lower level read amplifiers, an emitter electrode of which is connected to an emitter electrode of the seventh transistor and a collector electrode of which is connected to other of the pair of output nodes of the each of the first and the second lower level read amplifiers; and wherein each of the high capacity read amplifiers comprises:

a ninth transistor a base electrode of which is connected to one of the pair of input nodes of the each of the high capacity read amplifiers and a collector electrode of which is connected to one of the pair of output nodes of the each of the high capacity read amplifiers; and a tenth transistor a base electrode of which is connected to other of the pair of input nodes of the each of the high capacity read amplifiers, an emitter electrode of which is connected to an emitter electrode of the ninth transistor and a collector electrode of which is connected to other of the pair of output nodes of the each of the high capacity read amplifiers.

10. The semiconductor integrated circuit device for reading and writing according to claim 7, wherein each of the write/read coils of the write/read heads in the lower level magnetic heads connected to the first and the second pairs of lower level input/output terminals is a write/read coil of a three terminals type; and wherein each of the write/read coils of the write/read heads in the high capacity magnetic heads connected to the first and the second pairs of high capacity input/output terminals is a write/read coil of a two terminals type.

11. The semiconductor integrated circuit device for reading and writing according to claim 10, further comprising:

a center tap voltage output terminal for applying a center tap voltage to center taps of the write/read coils of the write/read heads in the lower level magnetic heads.

12. A semiconductor integrated circuit device for reading and writing comprising:

a first pair of lower level input/output terminals to which a write/read coil of a write/read head in a first lower level magnetic head is connected;

a second pair of lower level input/output terminals to which a write/read coil of a write/read head in a second lower level magnetic head is connected;

a first pair of high capacity input/output terminals to which a write/read coil of a write/read head in a first high capacity magnetic head is connected;

a second pair of high capacity input/output terminals to which a write/read coil of a write/read head in a second high capacity magnetic head is connected;

a first lower level read amplifier a pair of input nodes of which are connected to the first pair of lower level input/output terminals;

a second lower level read amplifier a pair of input nodes of which are connected to the second pair of lower level input/output terminals;

a first high capacity read amplifier a pair of input nodes of which are connected to the first pair of high capacity input/output terminals;

a second high capacity read amplifier a pair of input nodes of which are connected to the second pair of high capacity input/output terminals;

a first lower level write driver a pair of output nodes of which are connected to the first pair of lower level input/output terminals;

a second lower level write driver a pair of output nodes of which are connected to the second pair of lower level input/output terminals;

a first high capacity write driver a pair of output nodes of which are connected to the first pair of high capacity input/output terminals;

a second high capacity write driver a pair of output nodes of which are connected to the second pair of high capacity input/output terminals;

a selector for receiving a head select signal and selecting either one of the first and the second lower level read amplifiers and the first and the second high capacity read amplifiers;

a digital signal converting circuit for receiving an output from one of the lower level read amplifiers selected by the selector, converting the output into a digital signal having a binary value based on the received output and outputting the converted output as read signals to a first one of data output terminals; and an amplifying circuit for receiving an output from one of the high capacity read amplifiers selected by the selector, amplifying the received output by a predetermined gain and outputting the amplified output as read signals to a second one of the data output terminals.

13. The semiconductor integrated circuit device for reading and writing according to claim 12:

wherein each of the first and the second lower level write drivers comprises:

a pair of input nodes to which the write signals are inputted;

a first transistor a base electrode of which is connected to one of the pair of input nodes of the each of the first and the second lower level write drivers and a collector electrode of which is connected to one of the pair of output nodes of the each of the first and the second lower level write drivers; and a second transistor a base electrode of which is connected to other of the pair of input nodes of the each of the first and the second lower level write drivers, an emitter electrode of which is connected to an emitter electrode of the first transistor and a collector electrode of which is connected to other of the pair of output nodes of the each of the first and the second lower level write drivers; and wherein each of the first and the second high capacity write drivers comprises:

a pair of input nodes to which the write signals are inputted;

a third transistor a base electrode of which is connected to one of the pair of input nodes of the each of the first and the second high capacity write drivers and a collector electrode of which is connected to one of the pair of output nodes of the each of the first and the second high capacity write drivers;

a fourth transistor a base electrode of which is connected to other of the pair of input nodes of the each of the first and the second high capacity write drivers, an emitter electrode of which is connected to an emitter electrode of the third transistor and a collector electrode of which is connected to other of the pair of output nodes of the each of the first and the second high capacity write drivers;

a fifth transistor a base electrode of which is connected to the other of the pair of input nodes of the each of the first and the second high capacity write drivers, an emitter electrode of which is connected to the one of the pair of output nodes of the each of the first and the second high capacity write drivers and a collector electrode of which is connected to a power source potential node; and a sixth transistor a base electrode of which is connected to the one of the pair of input nodes of the each of the first and the second high capacity write drivers, an emitter electrode of which is connected to the other of the pair of output nodes of the each of the first and the second lower level write drivers and a collector electrode of which is connected to the power source potential node.

14. The semiconductor integrated circuit device for reading and writing according to claim 12:

wherein each of the first and the second lower level read amplifiers comprises:

a seventh transistor a base electrode of which is connected to one of the pair of input nodes of the each of the first and the second lower level read amplifiers via a diode element and a collector electrode of which is connected to one of the pair of output nodes of the each of the first and the second lower level read amplifiers; and an eighth transistor a base electrode of which is connected to other of the pair of input nodes of the each of the first and the second lower level read amplifiers, an emitter electrode of which is connected to an emitter electrode of the seventh transistor and a collector electrode of which is connected to other of the pair of output nodes of the each of the first and the second lower level read amplifiers; and wherein each of the high capacity read amplifiers comprises:

a ninth transistor a base electrode of which is connected to one of the pair of input nodes of the each of the high capacity read amplifiers and a collector electrode of which is connected to one of the pair of output nodes of the each of the high capacity read amplifiers; and a tenth transistor a base electrode of which is connected to other of the pair of input nodes of the each of the high capacity read amplifiers, an emitter electrode of which is connected to an emitter electrode of the ninth transistor and a collector electrode of which is connected to other of the pair of output nodes of the each of the high capacity read amplifiers.

15. The semiconductor integrated circuit device for reading and writing according to claim 12:

wherein each of the write/read coils of the write/read heads in the lower level magnetic heads connected to the first and the second pairs of lower level input/output terminals is a write/read coil of a three terminals type; and wherein each of the write/read coils of the write/read heads in the high capacity magnetic heads connected to the first and the second pairs of high capacity input/output terminals is a write/read coil of a two terminals type.

16. The semiconductor integrated circuit device for reading and writing according to claim 15, further comprising:

a center tap voltage output terminal for applying a center tap voltage to center taps of the write/read coils of the write/read heads in the lower level magnetic heads.

* * * * *